(12) United States Patent
Nakane

(10) Patent No.: US 8,947,717 B2
(45) Date of Patent: Feb. 3, 2015

(54) PRINT DATA PROCESSING APPARATUS

(71) Applicant: Canon Kabushiki Kaisha, Tokyo (JP)

(72) Inventor: Hiroyuki Nakane, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/100,996

(22) Filed: Dec. 9, 2013

(65) Prior Publication Data

US 2014/0168697 A1    Jun. 19, 2014

(30) Foreign Application Priority Data

Dec. 18, 2012 (JP) ................................ 2012-275791

(51) Int. Cl.
*G06F 3/12* (2006.01)
*G06K 15/02* (2006.01)
*H04N 1/405* (2006.01)
*H04N 1/46* (2006.01)
*H04N 1/32* (2006.01)

(52) U.S. Cl.
CPC .......... *G06K 15/1801* (2013.01); *G06F 3/1213* (2013.01); *G06F 3/1247* (2013.01); *G06F 3/1285* (2013.01)
USPC .......... 358/1.15; 358/1.2; 358/3.12; 358/530; 358/537; 358/426.01

(58) Field of Classification Search
None
See application file for complete search history.

(56) References Cited

U.S. PATENT DOCUMENTS

| 5,091,967 | A  | * | 2/1992 | Ohsawa .................. | 382/172 |
| 2005/0001933 | A1 | * | 1/2005 | Yoshikawa et al. ........... | 348/564 |
| 2006/0115123 | A1 | * | 6/2006 | Kanai et al. ................... | 382/104 |

FOREIGN PATENT DOCUMENTS

JP    2001-253125    9/2001
JP       4514168    7/2010

* cited by examiner

*Primary Examiner* — Thomas Lett
(74) *Attorney, Agent, or Firm* — Fitzpatrick, Cella, Harper & Scinto

(57) ABSTRACT

A print data processing apparatus is provided which includes: a generation unit configured to generate image information and attribute information from print data; a conversion unit configured to convert an attribute of a first area included in the attribute information, wherein an attribute of a second area included in the attribute information is not converted; a compression unit configured to compress the image information and the attribute information in which the attribute of the first area has been converted by the conversion unit; an area information generation unit configured to generate area information indicating the first area having the converted attribute; and a transmission unit configured to transmit the image information compressed by the compression unit, the attribute information compressed by the compression unit, and the area information generated by the area information generation unit, to a printing apparatus as transfer data.

9 Claims, 34 Drawing Sheets

| PRINTING APPARATUS PERFORMANCE INDEX [PPM] (A) | NETWORK BANDWIDTH [MB/sec] (B) | TRANSFER PERFORMANCE [MB] 60/(A)*(B) | TRANSFER DATA SIZE [MB] | | | | | |
|---|---|---|---|---|---|---|---|---|
| | | | ATTRIBUTE CONVERSION NOT PERFORMED | | | FIRST ATTRIBUTE CONVERSION | | SECOND ATTRIBUTE CONVERSION |
| 30 (2sec/page) | 5.0 | 10.0 | 8.0 | IMAGE INFORMATION 4.8MB | ATTRIBUTE INFORMATION 3.2MB | UNNECESSARY | | UNNECESSARY |
| 40 (1.5sec/page) | 5.0 | 7.5 | 8.0 | IMAGE INFORMATION 4.8MB | ATTRIBUTE INFORMATION 3.2MB | 7.7 / IMAGE INFORMATION 4.8MB | ATTRIBUTE INFORMATION 2.9MB | 7.4 / IMAGE INFORMATION 4.8MB / ATTRIBUTE INFORMATION 2.6MB |
| 40 (1.5sec/page) | 7.0 | 10.5 | 8.0 | IMAGE INFORMATION 4.8MB | ATTRIBUTE INFORMATION 3.2MB | UNNECESSARY | | UNNECESSARY |

| | ATTRIBUTE TYPE | START POSITION (x,y) | END POSITION (x,y) |
|---|---|---|---|
| 2302 | TEXT | (10,10) | (40,20) |
| 2303 | TEXT | (110,40) | (150,50) |

FIG.23

| | PRINTING APPARATUS PERFORMANCE INDEX [PPM] | NETWORK BANDWIDTH [MB/sec] | TRANSFER PERFORMANCE [MB] | TRANSFER DATA SIZE [MB/page] |
|---|---|---|---|---|
| 2500 | 30 | 5.0 | 10 | 12 |

| | DISPLAY LIST GENERATION PROCESSING [sec] | IMAGE TRANSFER PROCESSING [sec] | IMAGE AREA SEPARATION PROCESSING [sec] | PRINT PROCESSING [sec] |
|---|---|---|---|---|
| 2501 ATTRIBUTE CONVERSION NOT PERFORMED IMAGE AREA HINT ABSENT | 1.0 | 3.0 | 0 | 1.0 |
| 2502 ATTRIBUTE CONVERSION PERFORMED IMAGE AREA HINT ABSENT | 1.0 | 2.0 | 3.0 | 1.0 |
| 2503 ATTRIBUTE CONVERSION PERFORMED IMAGE AREA HINT PRESENT | 1.0 | 2.0 | 1.5 | 1.0 |

FIG.25

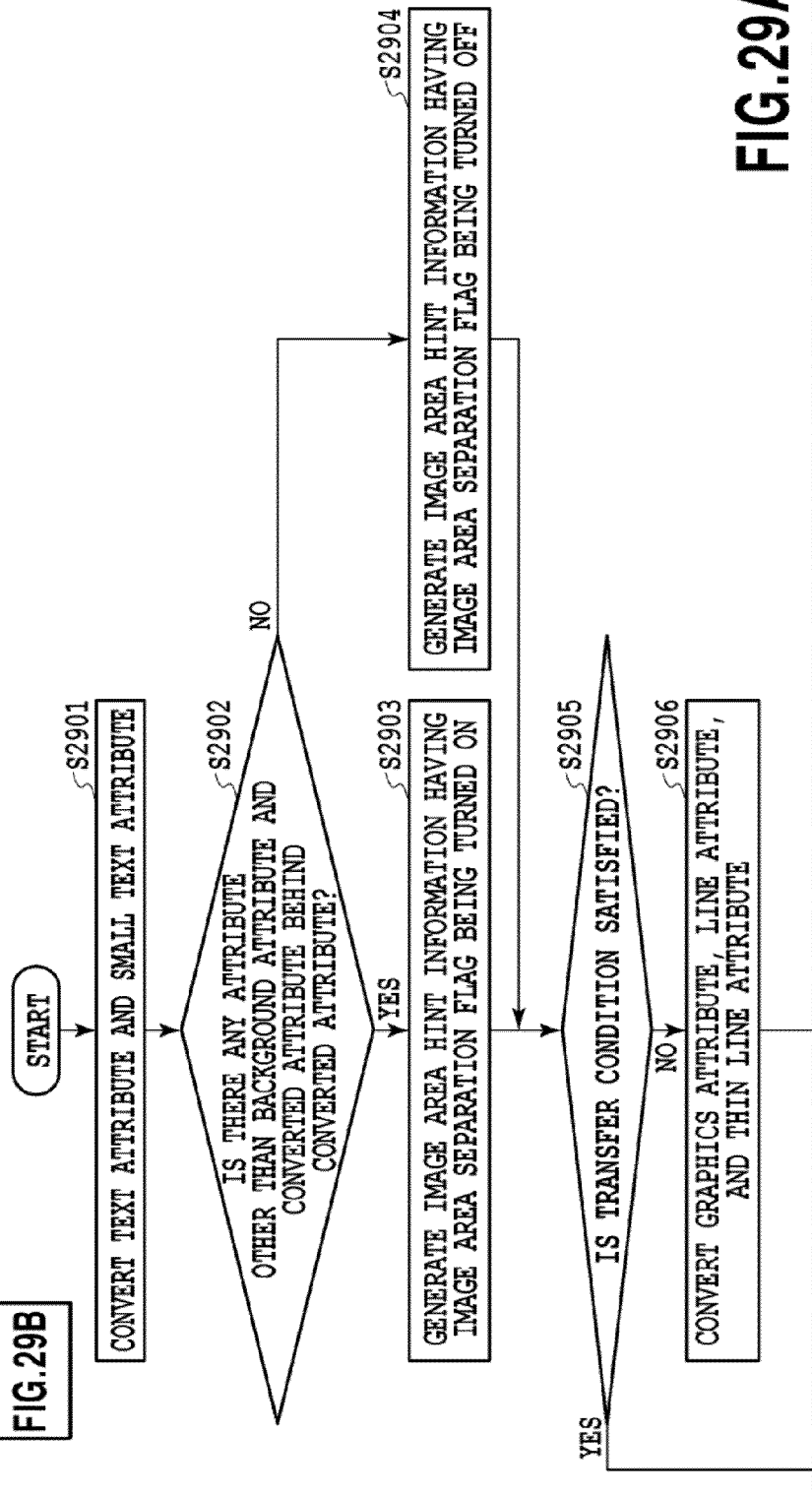

| | 3101a | 3101b | 3101c | 3101d |
|---|---|---|---|---|
| | ATTRIBUTE TYPE | START POSITION (x,y) | END POSITION (x,y) | IMAGE AREA SEPARATION FLAG |
| 3102 | TEXT | (10,10) | (40,20) | OFF |
| 3103 | TEXT | (110,40) | (150,50) | ON |

FIG.31

PRINT DATA PROCESSING APPARATUS

BACKGROUND OF THE INVENTION

1. Field of the Invention

The present invention relates to a print data processing apparatus which processes print data.

2. Description of the Related Art

There is a printing apparatus configured to analyze print data inputted, to output bitmap image information indicating pixel values of respective pixels and bitmap attribute information indicating attributes of the respective pixels, such as text, photographic image, and graphics, and to perform image processing on the image information with reference to the attribute information. Such technique is described in, for example, Japanese Patent No. 4514168.

Conventionally, the steps of analyzing the print data and outputting the image information and the attribute information are performed within the printing apparatus. However, with improvement in the CPU throughput of a server and development in network technology, a new configuration of the printing apparatus is under consideration, in which only steps dependent on an engine of the printing apparatus are performed within the printing apparatus, and steps not dependent thereon are performed by an external server. In this new configuration, the external server performs the analysis of print data and the output of the image information and the attribute information, which are not dependent on the engine, and this configuration therefore needs a step of transferring the outputted image information and attribute information to the printing apparatus.

This step of transferring the image information and the attribute information might create bottlenecks in the performance of the printing apparatus. To be more specific, the printing apparatus which receives these pieces of information and performs printing processing might not be able to print with its performance satisfying a required PPM (page per minute: the number of pages the printing apparatus is capable of printing for one minute), which is one of the indices of its performance.

SUMMARY OF THE INVENTION

A print data processing apparatus according to the present invention includes: a generation unit configured to generate image information and attribute information from print data; a conversion unit configured to convert an attribute of a first area included in the attribute information, wherein an attribute of a second area included in the attribute information is not converted; a compression unit configured to compress the image information and the attribute information in which the attribute of the first area has been converted by the conversion unit; an area information generation unit configured to generate area information indicating the first area having the converted attribute; and a transmission unit configured to transmit the image information compressed by the compression unit, the attribute information compressed by the compression unit, and the area information generated by the area information generation unit, to a printing apparatus as transfer data.

According to the present invention, before transferring the image information and the attribute information to the printing apparatus, the print data processing apparatus converts the attribute information in such a manner as to increase the compression efficiency. After the conversion, the attribute information has a size which creates no bottlenecks in the attribute information transferring step. Thus, the printing apparatus can perform printing processing which satisfies its performance index.

Further features of the present invention will become apparent from the following description of exemplary embodiments (with reference to the attached drawings).

BRIEF DESCRIPTION OF THE DRAWINGS

FIG. 14 is a diagram showing an example of relations between performance indices of the printing apparatus and transfer performance in Embodiment 1 of the present invention;

FIG. 23 is a diagram showing an example structure of the image area hint information in Embodiment 5 of the present invention;

FIG. 25 is a diagram illustrating an example of advantageous effects in Embodiment 5 of the present invention;

FIG. 29 is a diagram showing the relationship of FIGS. 29A and 29B;

FIGS. 29A and 29B are diagrams showing an example of a method of converting the attribute information and a method of generating image area hint information in Embodiment 8 of the present invention;

FIG. 31 is a diagram showing an example structure of the image area hint information in Embodiment 8 of the present invention;

DESCRIPTION OF THE EMBODIMENTS

Using the drawings, embodiments of the present invention are described below.

Embodiment 1

Figure 1:
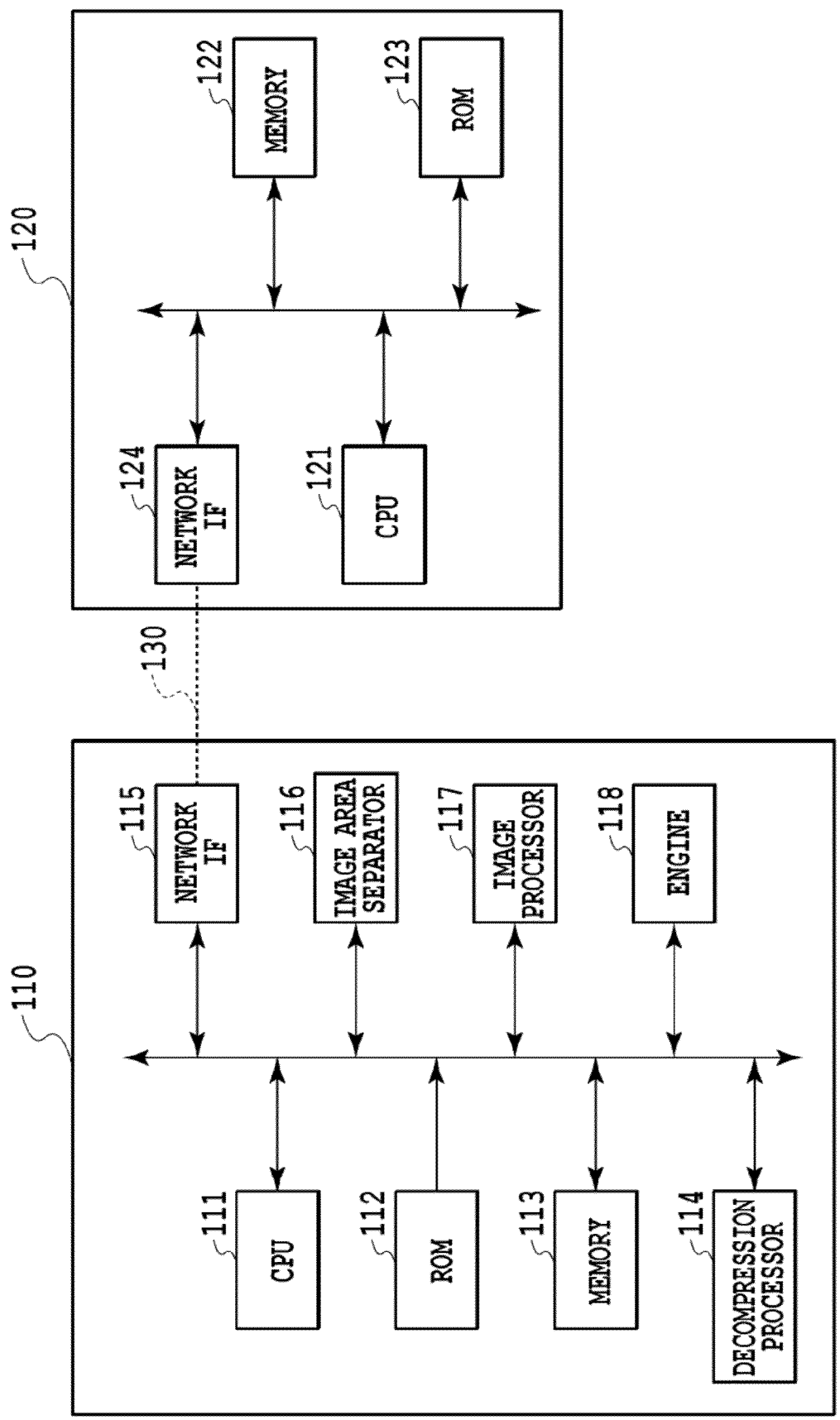
FIG. 1 is a diagram showing an example configuration of hardware of a printing apparatus and a print data processing apparatus in Embodiment 1 of the present invention.

FIG. 1 is a diagram showing an example of a hardware configuration of a printing apparatus 110 and a print data processing apparatus 120 connected to each other via a network 130, according to Embodiment 1. Being an apparatus for processing data used for printing, each of the printing apparatus 110 and the print data processing apparatus 120 can be referred to as a "print data processing apparatus" in a broad sense. However, for the convenience of description, an apparatus which receives print data in page description language (PDL) or the like and processes the print data is herein referred to as the "print data processing apparatus" 120 in a narrow sense. In addition, an apparatus which receives data processed by the print data processing apparatus 120 and performs printing processing using the data received is referred to as the printing apparatus 110.

A CPU 111 is a central processing unit (CPU) of the printing apparatus 110. Software 210 of the printing apparatus 110 to be described later operates on the CPU 111.

A memory 113 is a random access memory (RAM) which the CPU 111 can access. The memory 113 provides a space for memory necessary for the operation of the software 210 of the printing apparatus 110 to be described later.

A ROM 112 is a read-only memory (ROM) of the printing apparatus 110. Programs of the software 210 of the printing apparatus 110 to be described later are stored in the ROM 112, and read and executed by the CPU 111.

A decompression processor 114 is hardware capable of decompressing compressed data, irrespective of whether the data is compressed losslessly or lossily.

A network IF 115 is an interface which is connected to the network 130 and through which data is transmitted to and received from the print data processing apparatus 120.

An image area separator 116 is hardware capable of receiving image data as input, extracting an attribute of each pixel in the image data, and outputting attribute information. Details of the image information will be given later.

An image processor 117 is hardware configured to receive image information and attribute information as input, perform image processing on the image information with reference to the attribute information, and output image data for printing. Details of the attribute information will be given later.

An engine 118 is a printing engine configured to print, on a print sheet, the image data for printing outputted by the image processor 117.

A CPU 121 is a central processing unit (CPU) of the print data processing apparatus 120. Software 220 of the print data processing apparatus 120 to be described later operates on the CPU 121.

A memory 122 is a random access memory (RAM) which the CPU 121 can access. The memory 122 provides a space for memory necessary for the operation of the software 220 of the print data processing apparatus 120 to be described later.

A ROM 123 is a read-only memory (ROM) of the print data processing apparatus 120. Programs of the software 220 of the print data processing apparatus 120 to be described later are stored in the ROM 123, and read and executed by the CPU 121.

A network IF 124 is an interface which is connected to the network 130 and through which data is transmitted to and received from the printing apparatus 110.

Figure 2:
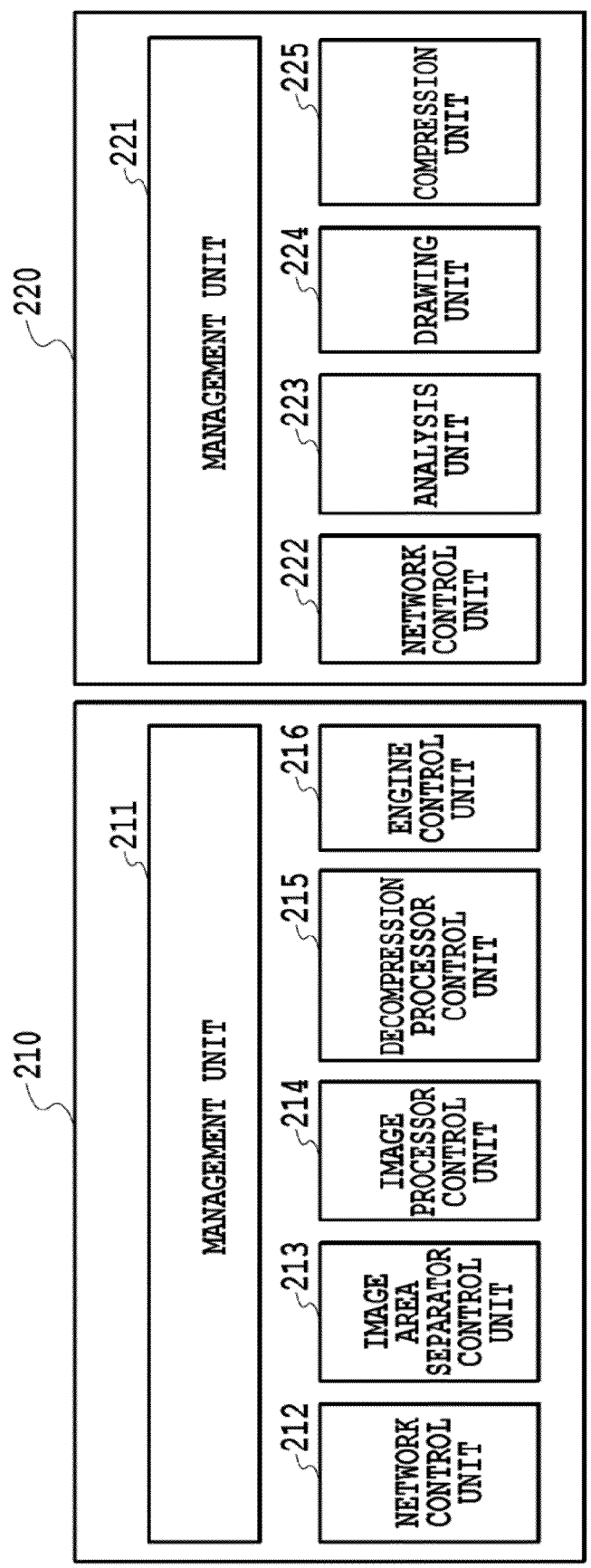
FIG. 2 is a diagram showing an example configuration of software modules of the printing apparatus and the print data processing apparatus in Embodiment 1 of the present invention.

FIG. 2 is a diagram showing the software configurations of the printing apparatus 110 and the print data processing apparatus 120.

The software 210 of the printing apparatus 110 is configured with, for example, six software modules. A management unit 211 is a module which manages the overall processing performed by the printing apparatus 110. A network control unit 212 is a module which controls connection to the network and data transmission and reception. An image area separator control unit 213, an image processor control unit 214, and a decompression processor control unit 215 are each a module which controls a corresponding one of the image area separator 116, the image processor 117, and the decompression processor 114, which are hardware of the printing apparatus 110. The decompression processor control unit 215 is configured to decompress compressed image information and attribute information received by the network control unit 212. The image area separator control unit 213 is configured to extract attribute information from the image information decompressed by the decompression processor control unit 215. The image processor control unit 214 is configured to perform image processing by using the attribute information extracted by the image area separator control unit 213 and the image information and the attribute information decompressed by the decompression processor control unit 215, and to output image data for printing. An engine control unit 216 is a module which controls the engine 118 of the printing apparatus 110. The engine control unit 216 is configured to perform printing by using the image data for printing outputted by the image processor control unit 214.

On the other hand, the software 220 of the print data processing apparatus 120 is configured with, for example, five software modules. A management unit 221 is a module which manages the overall processing performed by the print data processing apparatus 120. A network control unit 222 is a module which controls connection to the network and data transmission and reception. An analysis unit 223 is a module which analyzes print data obtained by the print data processing apparatus 120. A drawing unit 224 is a module which receives, as input, an analysis result of the print data derived by the analysis unit 223, and outputs image information and attribute information. A compression unit 225 is a module which can compress the image information and the attribute information outputted by the drawing unit 224.

Figure 3:
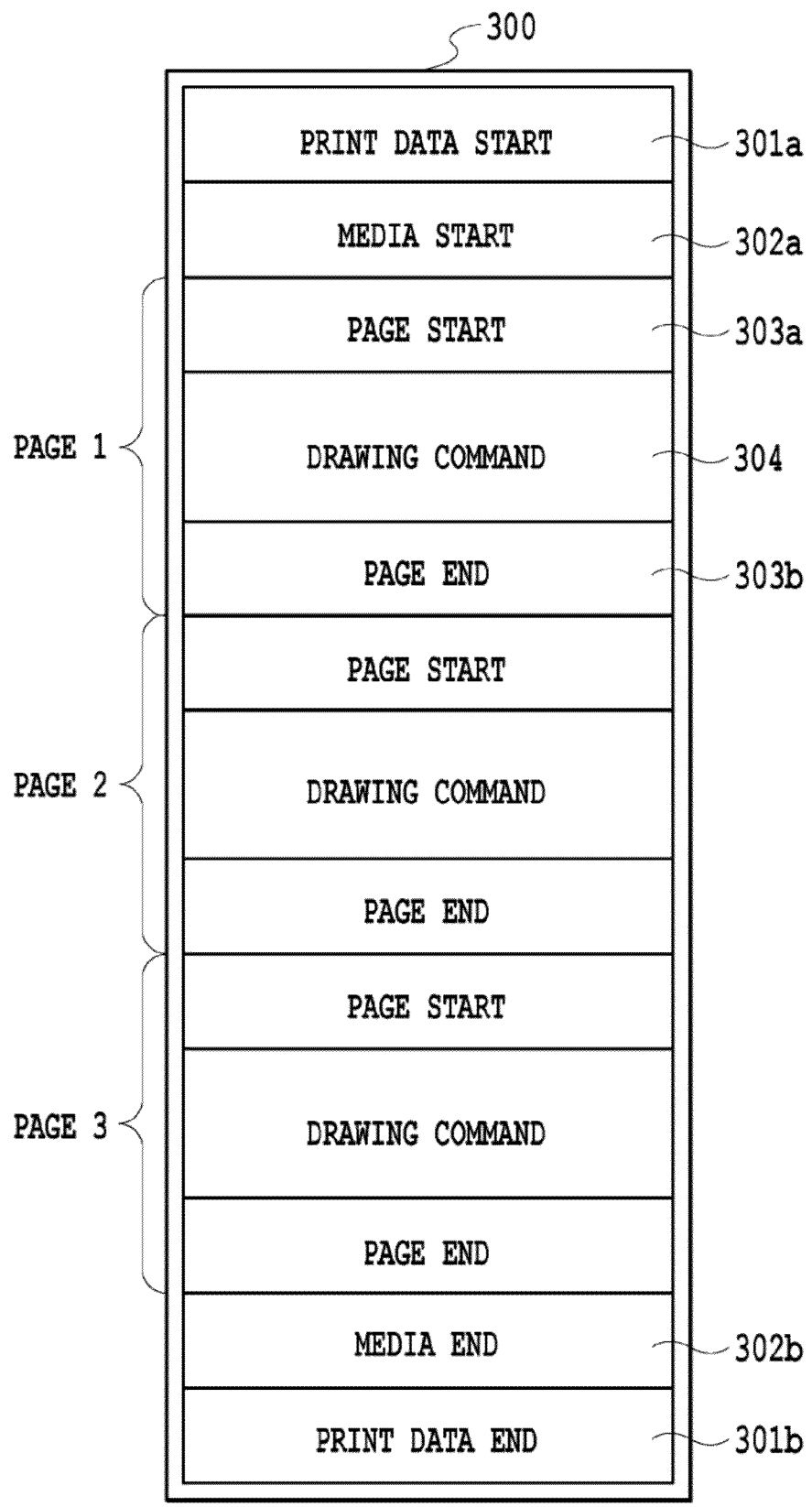
FIG. 3 is a diagram showing an example data configuration of print data in Embodiment 1 of the present invention.
Figure 4:
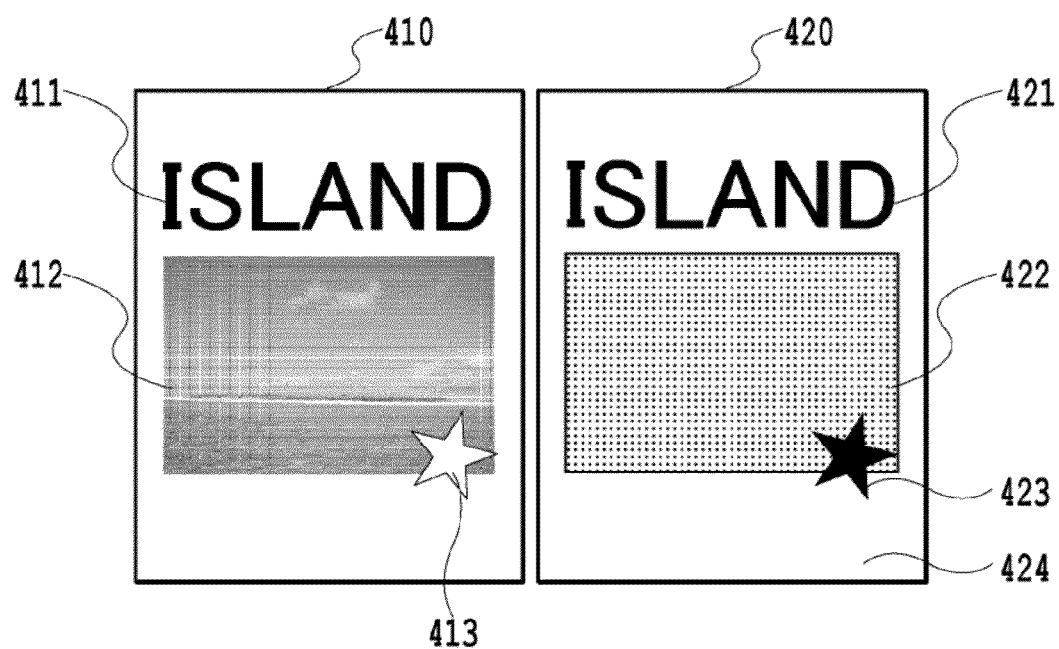
FIG. 4 is a diagram showing an example of image information and an example of attribute information in Embodiment 1 of the present invention.

FIG. 3 shows an example of the data structure of print data of Embodiment 1, and FIG. 4 shows an example of image information and attribute information of Embodiment 1.

Print data 300 includes multiple commands such as ones given below. A print data start command 301a indicates start of print data and is paired with a print data end command 301b indicating end of the print data. Information contained in the print data start command 301a is valid until the print data end command 301b. A media start command 302a contains information indicating the type of a print sheet, and is paired with a media end command 302b. Information contained in the media start command 302a is valid until the media end command 302b. A page start command 303a indicates start of a page, and is paired with a page end command 303b.

A drawing command 304 includes drawing commands for drawing a drawing-target object. The drawing commands exist for respective attributes of an object, such as a text drawing command for drawing a text and a photographic image drawing command for drawing a photographic image. The analysis unit 223 can determine the attribute of a drawing-target object, whether the object is a text or an image, for example, by analyzing the drawing command. Then, based on the result of the analysis by the analysis unit 223, the drawing unit 224 obtains image information 410 by bitmapping the shape of the object, and obtains attribute information 420 by bitmapping the attribute of the object. Then, the drawing unit 224 outputs the image information 410 and the attribute information 420.

In Embodiment 1, one pixel of the image information 410 is formed by a total of 24 bits—8 bits for each of R, G, and B of an RGB value. One pixel of the attribute information 420 is formed by 4 bits indicated by reference numeral 510 in FIG. 5. "Bit 0" and "bit 1" indicated by reference numeral 511 represent a basic object with their combination, such as a photographic image (00), a graphics (01), and a text (11). In a case where "bit 2" indicated by reference numeral 512 is 1, "bit 2" indicates that the object is small or thin. In a case where "bit 3" indicated by reference numeral 513 is 1, "bit 3" indicates that the pixel is not an object but a background used as a foundation in drawing an object. Relations between attributes of an object and bit strings used in this embodiment are as shown in a table 520 in FIG. 5. Note that, in the example in FIG. 5, the background attribute has 1 in not only "bit 3" but also the other bits.

In a case where a value of an area 421 where "ISLAND" is drawn is "0x3," the value indicates that an area 411 of the image information 410 where "ISLAND" is drawn is a text attribute. Similarly, in a case where values of drawing areas 422 and 423 are "0x0" and "0x1," respectively, the values indicate that drawing areas 412 and 413 are a photographic image attribute and a graphics attribute, respectively. A value of an area 424 where no object is drawn is "0xF" indicating a background attribute.

Figure 6:
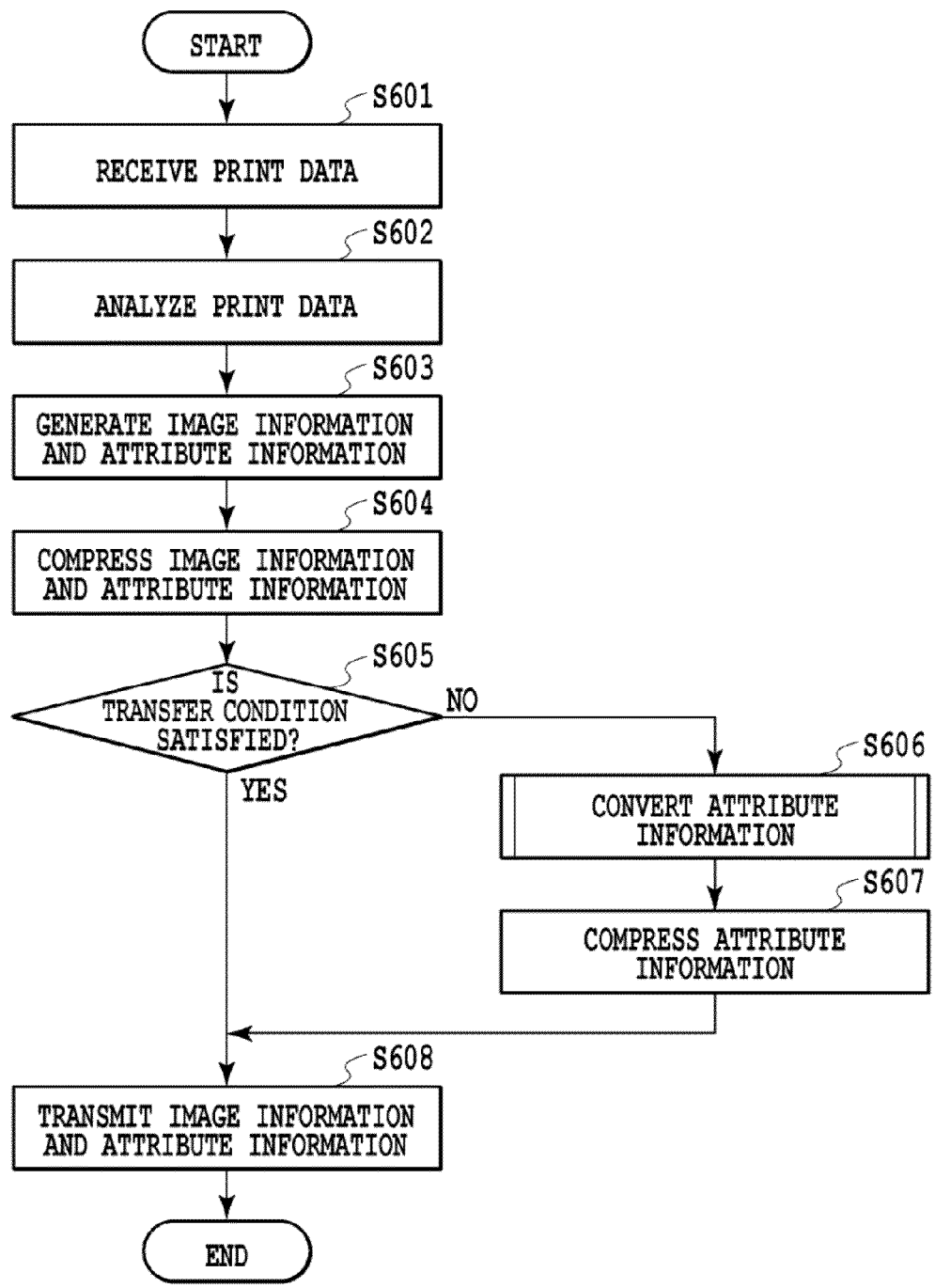
FIG. 6 is a flowchart showing an example of main processing performed by the print data processing apparatus in Embodiment 1 of the present invention.

FIG. 6 is a flowchart showing an example of processing performed by the software 220 of the print data processing apparatus 120 in Embodiment 1. The processing shown in FIG. 6 is implemented by the CPU 121 executing the programs stored in the ROM 123.

In Step S601, the management unit 221 of the print data processing apparatus 120 receives print data through the network IF 124 by using the network control unit 222. The print data received may be received from the printing apparatus 110 or from any other apparatus along with a control command to cause the printing apparatus 110 to print.

In Step S602, the analysis unit 223 analyzes the print data received. As described above, the analysis unit 223 refers to the print data and outputs a result of the analysis.

In Step S603, the drawing unit 224 receives, as input, the result of the analysis derived by the analysis unit 223, and generates and outputs image information and attribute information like the ones described in FIG. 4.

In Step S604, the compression unit 225 compresses each of the image information and the attribute information outputted by the drawing unit 224. Here, the compression unit 225 performs lossy compression on the image information, and lossless compression on the attribute information. As described above, the attribute information represents the difference in information for each area clearly by bits. Thus, the lossless compression which does not lose any information by decompression is employed for the attribute information. On the other hand, as for the image information, even in a case where information is lost in decompression, the lost information can be interpolated based on the image information and attribute information therearound. Thus, the lossy compression having higher compressibility is employed for the image information. Although the lossy compression is preferable for the image information in view of the performance in transfer, the image information may be compressed losslessly depending on the operation.

In Step S605, the management unit 221 determines whether a transfer condition is satisfied or not, in other words, whether the transfer performance is achieved. The transfer performance can be derived from the following formula.

$$60/a \text{ printing apparatus performance index [ppm]*network baseband [MB/sec]} \quad \text{Formula 1}$$

The printing apparatus 110 can print while meeting its performance index as long as the size of the image information and the attribute information transferred from the print data processing apparatus 120 to the printing apparatus 110 is smaller than the value of the above transfer performance. Specifically, the transfer condition is determined based on the performance index of the printing apparatus 110, the bandwidth of the network between the printing apparatus 110 and the print data processing apparatus 120, the compressed size of the image information, and the compressed size of the attributed information. As a result of the determination, the management unit 221 proceeds to Step S608 in a case where the transfer condition is satisfied, or proceeds to Step S606 in a case where the transfer condition is not satisfied.

FIG. 14 is a table of three exemplar cases each showing, with actual values, a relation among the printing apparatus performance index, the network bandwidth, the transfer performance, and the transfer data size.

In a top case 1401, the printing apparatus performance index is 30 ppm, and the network bandwidth is 5 MB. Thus, the transfer performance is 10 MB. In this example, in a case where the transfer data size is 8 MB (4.8 MB for the image information+3.2 MB for the attribute information), the transfer performance>the transfer data size. Thus, the management unit 221 determines that the transfer condition is satisfied.

In a middle case 1402, the printing apparatus performance index is 40 ppm, and the network bandwidth is 5 MB. Thus, the transfer performance is 7.5 MB. In this example, in a case where the transfer data size is 8 MB (4.8 MB for the image information+3.2 MB for the attribute information), the transfer performance<the transfer data size. Thus, the management unit 221 determines that the transfer condition is not satisfied. Then, the attribute information is converted the first time, as will be described later. Nonetheless, in the middle case 1402, the transfer data size is 7.7 MB (4.8 MB for the image information+2.9 MB for the attribute information), which still does not satisfy the transfer condition. Then, the attribute information is converted the second time, and this makes the transfer size be 7.4 MB (4.8 MB for the image information+2.6 MB for the attribute information). Thus, the management unit 221 determines that the transfer condition is satisfied.

In a bottom case 1403, the printing apparatus performance index is 30 ppm, and the network bandwidth is 7 MB. Thus, the transfer performance is 10.5 MB. In this example, in a case where the transfer data size is 8 MB (4.8 MB for the image information+3.2 MB for the attribute information), the transfer performance>the transfer data size. Thus, the management unit 221 determines that the transfer condition is satisfied.

In a case where the management unit 221 determines in Step S605 that the transfer condition is not satisfied, in Step S606 the management unit 221 converts the attribute information outputted by the drawing unit 224. Details of a method of the conversion will be given later.

In Step S607, the compression unit 225 compresses the attribute information losslessly.

Figure 12:
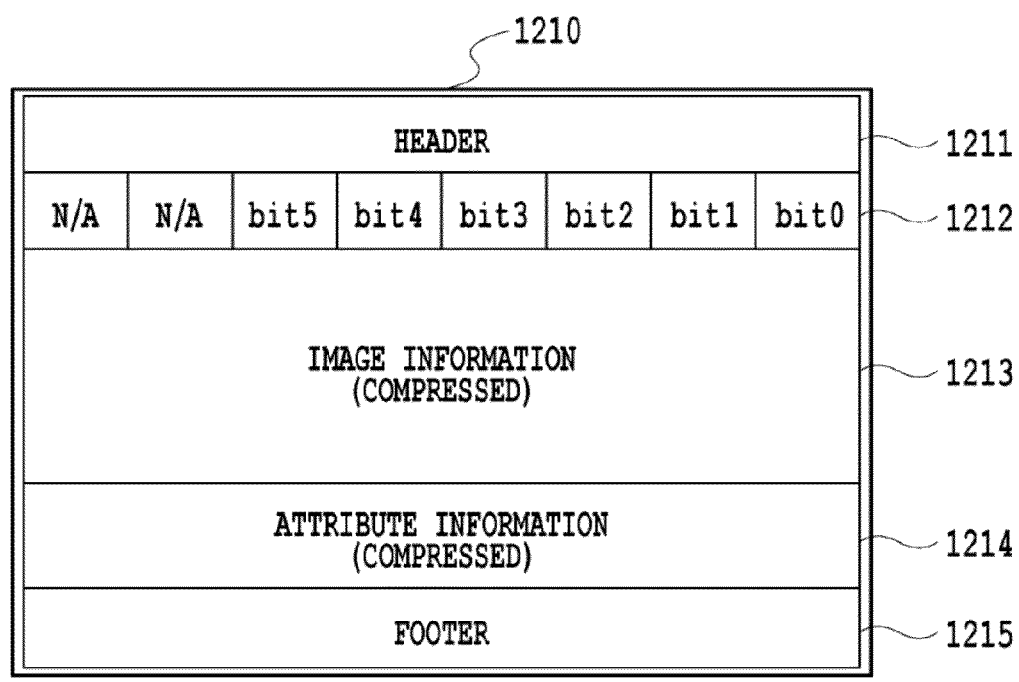
FIG. 12 is a diagram showing an example data configuration of data transferred from the print data processing apparatus to the printing apparatus in Embodiment 1 of the present invention.

In Step S608, the management unit 221 transfers the compressed image information and attribute information to the printing apparatus 110 through the network IF 124 by using the network control unit 222. FIG. 12 shows an example of the structure of transfer data 1210. Compressed image information 1213 and attribute information 1214 are sandwiched by a header 1211 and a footer 1215. Conversion history information 1212 is information indicating whether the print data processing apparatus 120 has converted attributes in the attribute information or not. Here, a text attribute, a small text attribute, a line attribute, a graphics attribute, and a photographic image attribute are allocated to "bit 0" to "bit 5," respectively, and "1" is set to an attribute that has been converted. For example, in a case where the print data processing apparatus has converted the text attribute to the background attribute, "1" is set to "bit 0."

Figure 7:
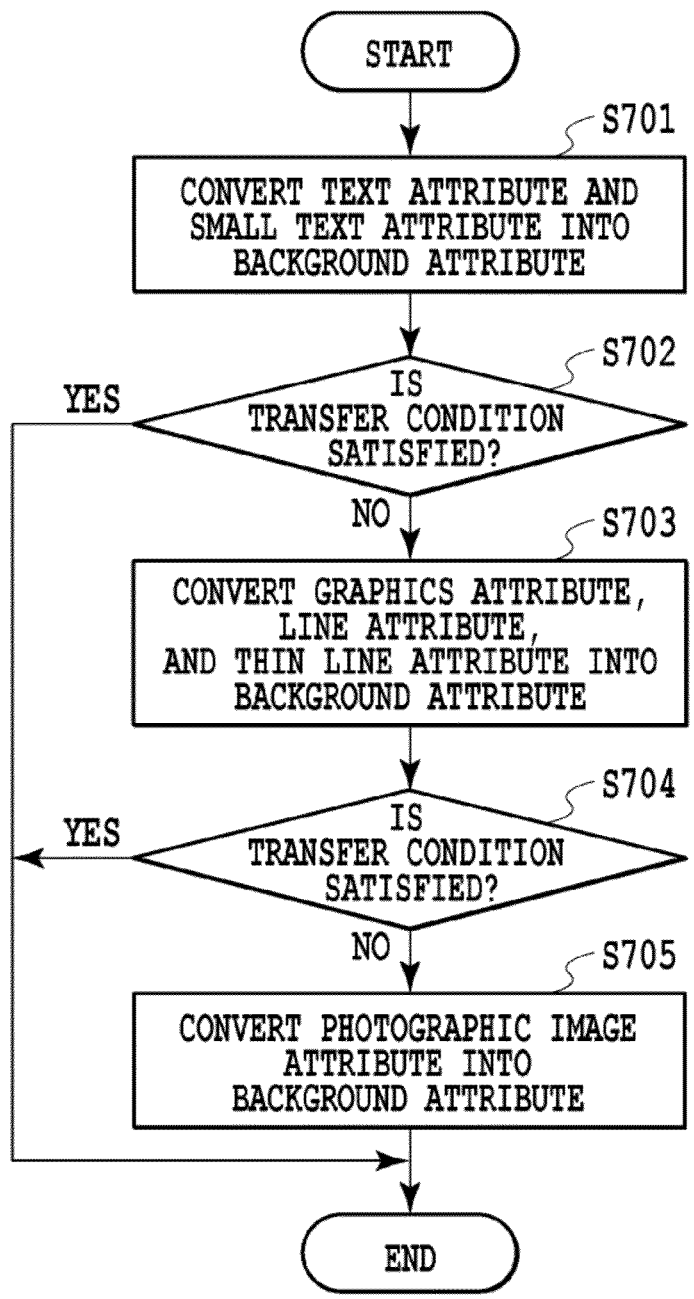
FIG. 7 is a flowchart showing an example of an attribute information conversion method in Embodiment 1 of the present invention.

Next, using a flowchart in FIG. 7, a detailed description is given of a method of the attribute conversion in Step S606. Generally, the efficiency of compression processing is higher for an attribute of a simple shape than for an attribute of a complicated shape. Thus, in this embodiment, the compression efficiency is improved by reducing an attribute of a complicated shape for which the compression efficiency is low.

In Step S701, the management unit 221 converts all the text attribute (0x3) and the small text attribute (0x7) in the attribute information into the background attribute (0xF). Generally, a text in an electronic document is either the text attribute or the small text attribute. A text has a complicated shape, and contributes to a decrease in the efficiency of compressing the attribute information. On the other hand, an electronic document has many large background portions where no drawing is performed. Thus, in this embodiment, the text attribute (0x3) and the small text attribute (0x7) are converted into the background attribute (0xF) to improve the efficiency of compressing the attribute information.

In Step S702, the management unit 221 determines whether the transfer condition is satisfied. Specifically, the management unit 221 checks whether the transfer performance satisfying the performance index of the printing apparatus 110 can be achieved with the attribute information in which the text attribute and the small text attribute have been converted into the background attribute. The checking method is the same as that in Steps S605 to S607 in FIG. 6, and is therefore not described again here. The management unit 221 proceeds to Step S703 upon determining that the transfer condition is not satisfied, or ends the attribute conversion processing upon determining that the transfer condition is satisfied.

In Step S703, the management unit 221 converts all the graphics attribute (0x1), the line attribute (0x2), and the thin line attribute (0x6) in the attribute information into the background attribute (0xF). Generally, a figure, a halftone consisting of large and small dots, a ruled line, a broken like, and the like are any of the graphics attribute, the line attribute, and the thin line attribute. Objects of these attributes are scattered on a page of an electronic document and sometimes have complicated shapes. Thus, the efficiency of compressing the attribute information is poor for objects of those attributes, compared to objects of the photographic image attribute existing over a certain area, as will be described later. For this reason, in this embodiment, after the first conversion processing for the text attribute (0x3) and the small text attribute (0x7), the graphics attribute (0x1), the line attribute (0x2), and the thin line attribute (0x6) are converted into the background attribute (0xF) as second conversion processing, to improve the efficiency of compressing the attribute information.

In Step S704, the management unit 221 determines again whether the transfer condition is satisfied. Specifically, the management unit 221 checks whether the transfer performance satisfying the performance index of the printing apparatus 110 can be achieved with the attribute information in which the graphics attribute, the line attribute, and the thin line attribute have been converted into the background attribute. The management unit 221 proceeds to Step S705 upon determining that the transfer condition is not satisfied, or ends the attribute conversion processing upon determining that the Upon determining in Step S704 that the transfer condition is not satisfied, in Step S705 the management unit 221 converts the photographic image attribute (0x1) into the background attribute (0xF) as third conversion processing. Generally, a photographic image in an electronic document is an object of the photographic image attribute. An object of the photographic image attribute tends to exist over a certain area, and the efficiency of compressing the attribute information therefor is originally favorable. For this reason, in this embodiment, the photographic image attribute is the last attribute to be converted into the background attribute.

Figure 13:
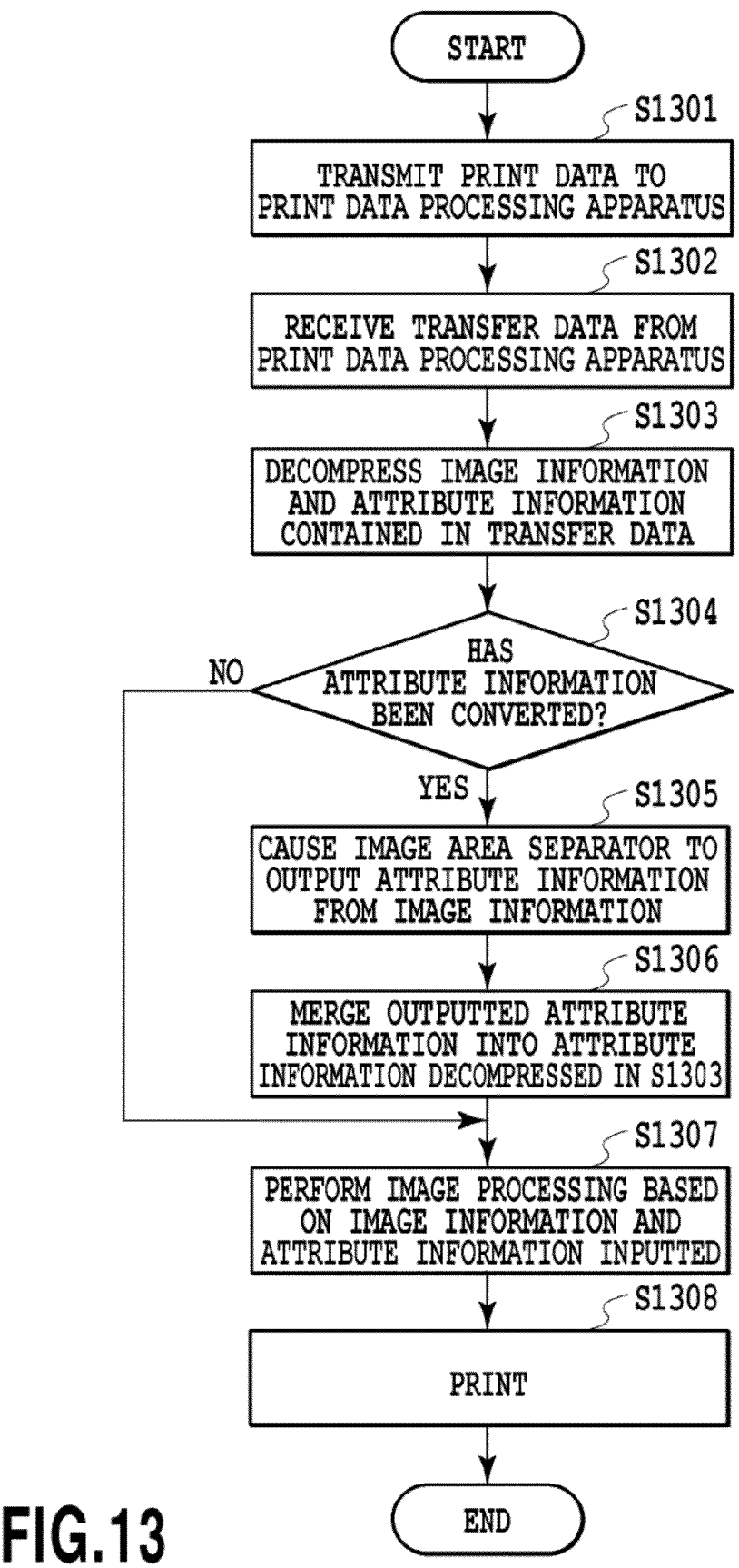
FIG. 13 is a flowchart showing an example of a series of processing performed by the printing apparatus in Embodiment 1 of the present invention.

FIG. 13 is a flowchart showing processing performed by the software 210 of the printing apparatus 110 in this embodiment. The processing in FIG. 13 is implemented by the CPU 111 executing the programs stored in the ROM 112.

In Step S1301, the management unit 211 transfers print data received by the printing apparatus 110 to the print data processing apparatus 120 through the network IF 115 by using the network control unit 212. Note that Step S1301 is not essential, and the processing may start from Step S1302. To be more specific, the printing apparatus 110 may perform processing described below, using data transmitted from the print data processing apparatus 120 without transmitting print data to the print data processing apparatus 120.

In Step S1302, the management unit 211 receives transfer data transmitted by the print data processing apparatus 120, by using the network control unit 212. The transfer data is, for example, like the one shown in FIG. 12.

Since the image information 1213 and the attribute information 1214 contained in the transfer data received in Step S1302 have been compressed, in Step S1303 the decompression processor control unit 215 causes the decompression processor 114 to decompress the compressed image information and attribute information.

In Step S1304, the management unit 211 refers to the conversion history information 1212 contained in the transfer data, and determines whether the attribute information has been converted by the print data processing apparatus 120 or not. The management unit 211 proceeds to Step S1305 upon determining that the attribute information has been converted, or proceeds to Step S1307 upon determining that the attribute information has not been converted.

In Step S1305, the image area separator control unit 213 inputs the image information decompressed in Step S1303 to the image separator 116 and causes the image separator 116 to output attribute information. Using FIG. 15, a description is given below of processing performed by the image area separator 116 in Step S1305.

Figure 15:
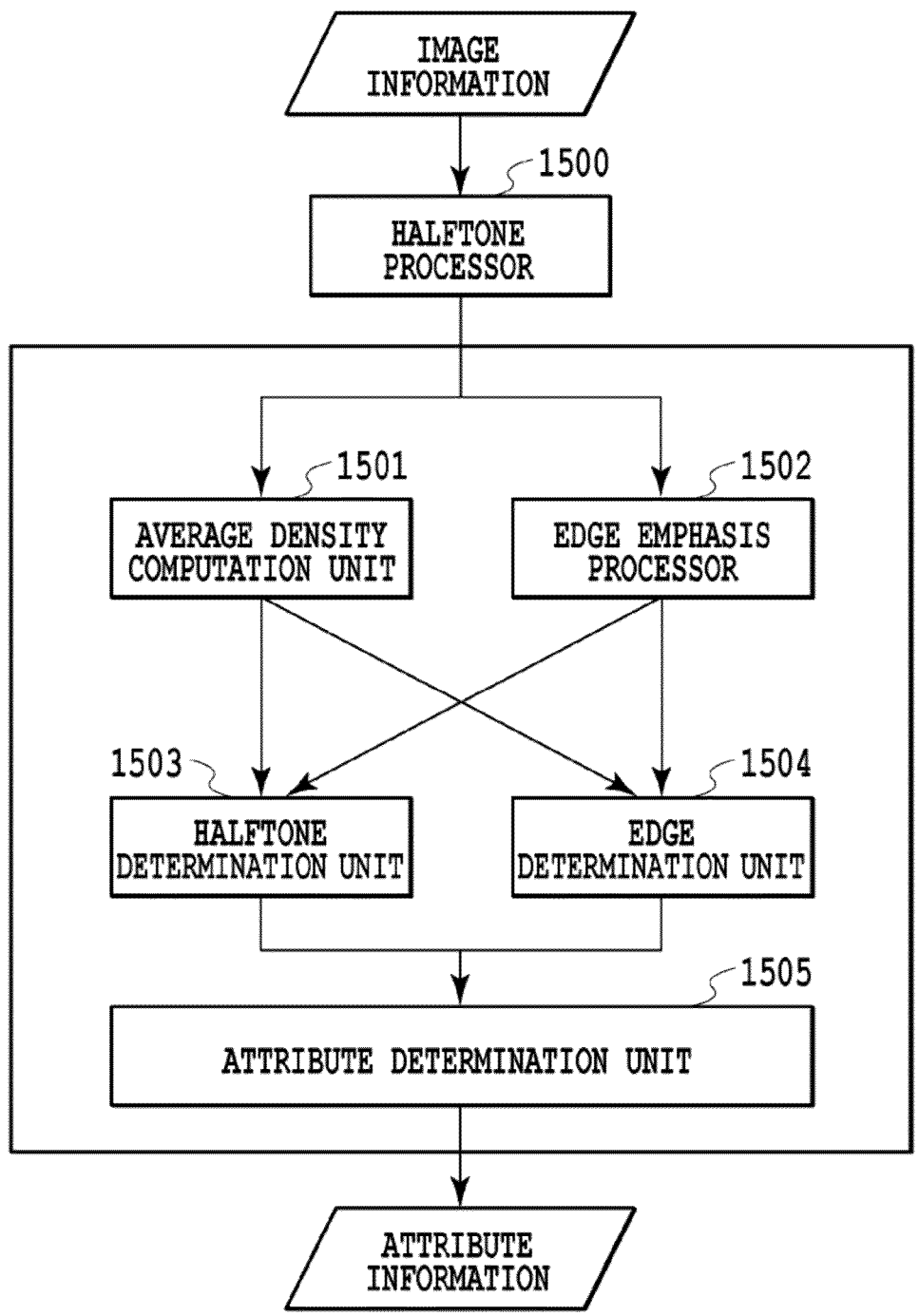
FIG. 15 is a diagram showing an example of processing performed by an image area separator of the printing apparatus in Embodiment 1 of the present invention.

FIG. 15 is a diagram showing an example of processing performed by the image area separator 116. The image information is an RGB contone image and therefore has no information needed by image area separation processing, such as a halftone. Hence, the image information is inputted into a halftone processing unit 1500. The halftone processing unit 1500 is configured to perform processing for generating a halftone by dividing the continuous tone of the RGB image into dots of various sizes, representing color tone. The image information generated by the halftone processing unit 1500 is inputted into an average density computation unit 1501 and an edge emphasis processing unit 1502. The average density computation unit 1501, for example, calculates the average density of an area of five pixels by five pixels, i.e., 25 pixels.

The edge emphasis processing unit 1502 performs edge emphasis processing on an area of, for example, fixe pixels by five pixels. In this embodiment, a differential filter having spatial frequency characteristics suitable for extracting edges of a texts and a halftone is used as a filter coefficient for edge emphasis.

The average density data calculated by the average density computation unit 1501 and the edge emphasis data obtained by the edge emphasis processing unit 1502 are inputted to each of a halftone determination unit 1503 and an edge determination unit 1504.

The halftone determination unit 1503 refers to the average density outputted by the average density computation unit 1501 and the edge emphasis data outputted by the edge emphasis processing unit 1502 and extracts, as a halftone area, an area having a high average density and being determined as coinciding with a halftone pattern as a result of pattern matching processing.

The edge determination unit 1504 receives, as input, the average density data outputted by the average density computation unit 1501 and the edge emphasis data outputted by the edge emphasis processing unit 1502 and extracts edge portions.

An attribute determination unit 1505 determines that the halftone area has the graphics attribute, and a portion which is not the halftone area and is an edge portion has the text attribute.

In Step S1306, from the attribute information outputted in Step S1305, the management unit 211 takes an attribute whose conversion history information 1212 shows that the attribute has been converted, and merges the attribute into the attribute information decompressed in Step S1303, creating new attribute information. In other words, the management unit 211 updates the attribute information decompressed in Step S1303 by using the attribute information outputted in Step S1305.

In Step S1307, the image processor control unit 214 inputs the image information decompressed in Step S1303 and the attribute information decompressed in Step S1303 or the attribute information obtained by the merging in Step S1306 to the image processor 117, and causes the image processor 117 to perform image processing.

Note that the processing from Steps S1303 to S1307 is to always be performed at a speed satisfying the PPM, which is the performance index of the printing apparatus 110. A case where this series of processing creates bottlenecks in the performance of the printing apparatus 110 will be described in and after Embodiment 5.

In Step S1308, the management unit 211 passes a result of the image processing in Step S1307 to the engine control unit 216, which then prints using the engine 118.

In this embodiment, it is assumed that an attribute behind a converted attribute is the background attribute for simplicity purpose. To improve the efficiency of compressing the attribute information, the attribute is to be converted into an attribute therebehind. For example, in a case where an attribute to be converted is the text attribute and an attribute behind the converted attribute is the graphics attribute, the text attribute is converted not into the background attribute, but into the graphics attribute. Details of a method of converting an attribute into an attribute therebehind will be given in Embodiment 8.

According to the processing in this embodiment, in transfer of the image information and the attribute information from the print data processing apparatus 120 to the printing apparatus 110, the attribute information is converted according to the transfer performance. Thereby, the printing apparatus 110 can print while maintaining its performance index, PPM.

Embodiment 2

In Embodiment 2, the attribute information is converted by a method different from that in Embodiment 1. The apparatuses configurations and processing flows can be the same as those of Embodiment 1, except for the points described below.

Figure 8:
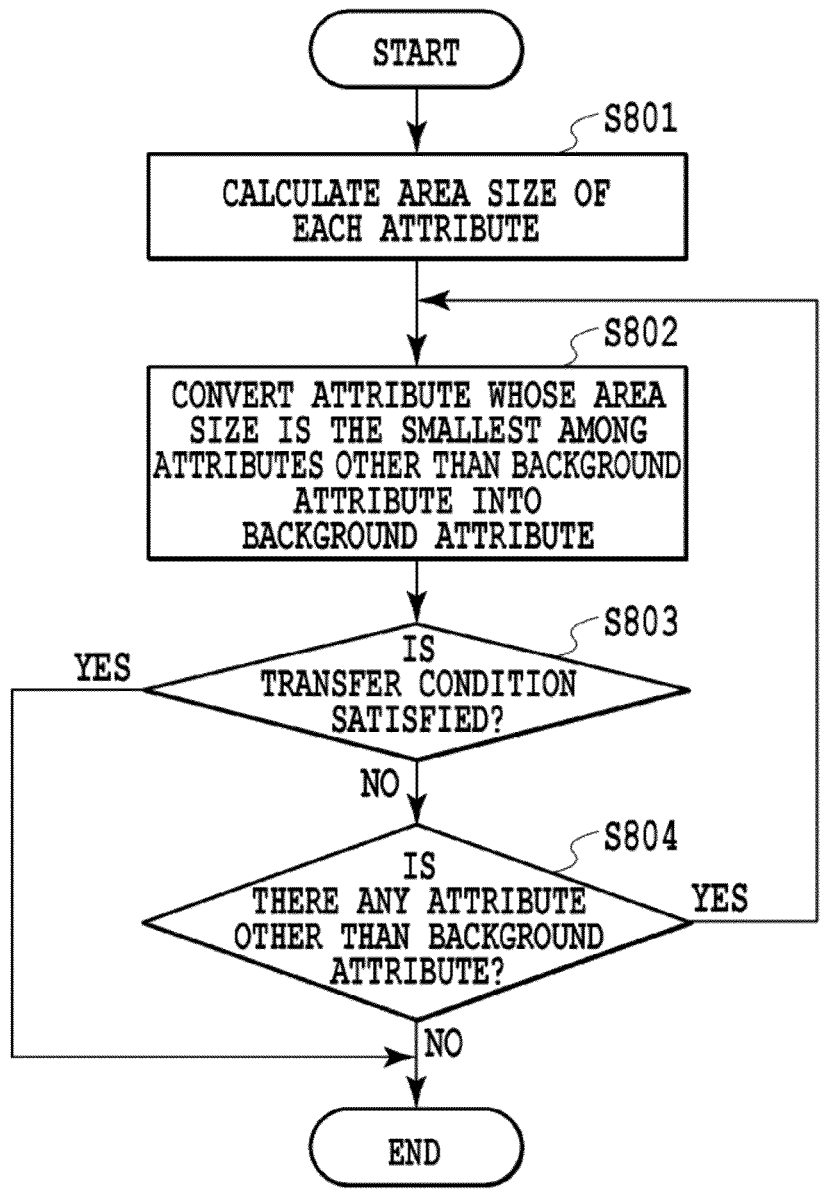
FIG. 8 is a flowchart showing an example of an attribute information conversion method in Embodiment 2 of the present invention.

FIG. 8 is a flowchart showing an attribute-information conversion method different from that in Embodiment 1 in the processing in Step S606 in FIG. 6. In Embodiment 2, based on an idea that, in the attribute information, an attribute with a small area is not as important as an attribute with a large area, attribute conversion into the background attribute is performed sequentially from an attribute with a smallest area size.

In Step S801, the management unit 221 of the print data processing apparatus 120 calculates the area size of each attribute contained in the attribute information. Here, the area size refers to the number of pixels of that attribute.

In Step S802, the management unit 221 converts an attribute whose area size is the smallest among all the attributes, except for the background, in the attribute information into the background attribute (0xF).

In Step S803, the management unit 221 determines whether the transfer condition is satisfied. Specifically, the management unit 221 checks whether the transfer performance satisfying the performance index of the printing apparatus 110 can be achieved with the attribute information in which the attribute with the smallest area size has been converted into the background attribute. The checking method is the same as that described in Embodiment 1, and is therefore not described again here. The management unit 221 ends the attribute conversion processing upon determining that the transfer condition is satisfied, or proceeds to Step S804 upon determining that the transfer condition is not satisfied.

In Step S804, the management unit 221 determines whether there is any attribute in the current attribute information, other than the background attribute. The management unit 221 proceeds to Step S802 upon determining that there is any attribute other than the background attribute in the current attribute information, or ends the attribute conversion processing upon determining that there is no other attribute.

Compared to Embodiment 1 in which the attribute conversion is performed in a predetermined order, in Embodiment 2 the attribute of an object whose area to be printed is large in size tends to remain. In a case where the transfer performance is achieved with a small number of conversions, the difference in the attribute information between before and after the conversion is little, which allows many pieces of information effective for printing to be inputted to the image processor 117, and consequently allows a high-quality printing result to be obtained.

Embodiment 3

In Embodiment 3, the attribute information is converted by conversion processing different from that in Embodiment 1 or 2. The apparatuses configurations and processing flows can be the same as those of Embodiment 1, except for the points described below.

Figure 9:
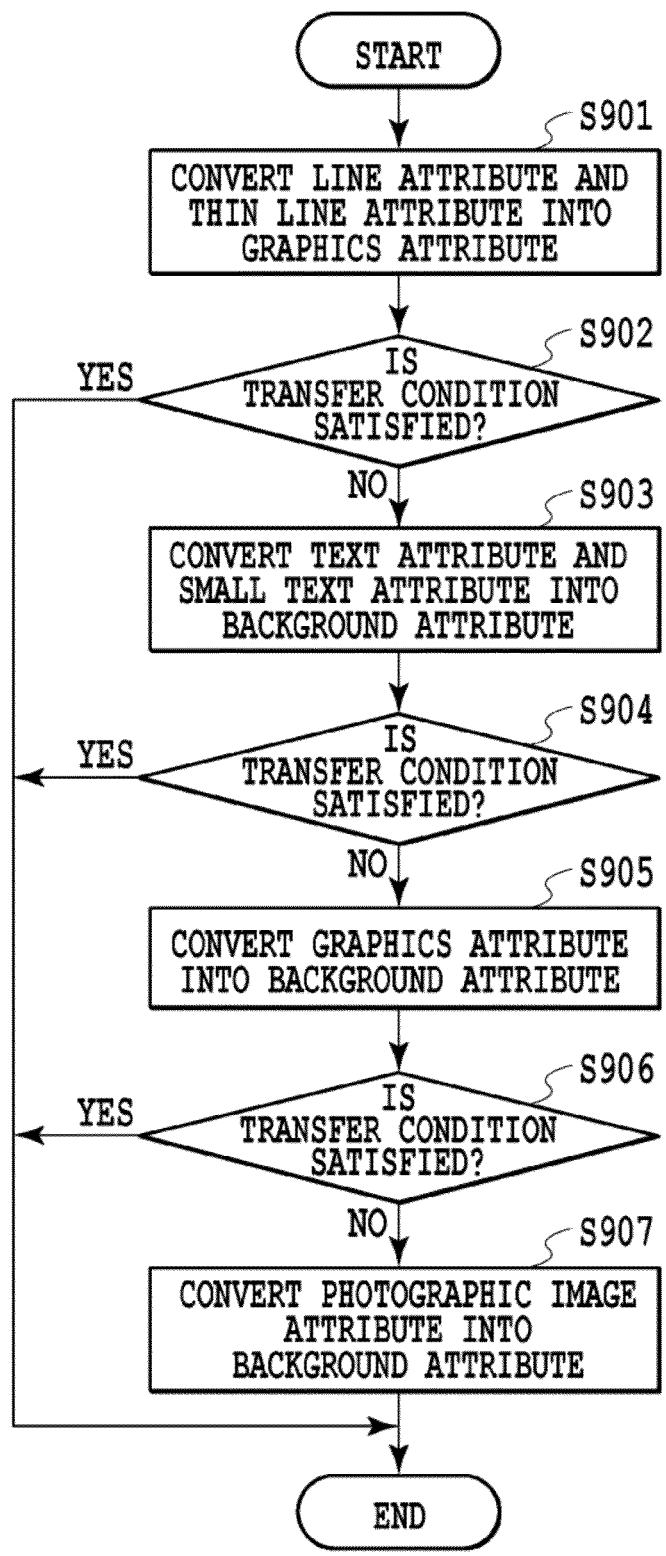
FIG. 9 is a flowchart showing an example of an attribute information conversion method in Embodiment 3 of the present invention.

FIG. 9 is a flowchart showing an attribute-information conversion method which is different from those of Embodiments 1 and 2 in the processing in Step S606 in FIG. 6. Objects of strongly related attributes are often located adjacent to each other. In this embodiment, the efficiency of compressing the attribute information is improved by putting those attributes together into one attribute at the beginning. Here, strongly related attributes refer to attributes that are likely to be used at the same time within one object or among multiple objects. For example, an object of the line attribute or the thin line attribute is often used as an outline of an object of the graphics attribute; therefore, these attributes can be said to be strongly related attributes.

In Step S901, as first conversion processing, the management unit 221 converts the line attribute (0x2) and the thin line attribute (0x6) in the attribute information into the graphics attribute (0x1). In a general electronic document, as described above, the graphics attribute is strongly related to the line attribute and the thin line attribute, and the outline of an object of the graphics attribute is often represented by an object of the line attribute or the thin line attribute. In this case, the graphics attribute and the line attribute or the thin line attribute being adjacent to each other in a complicated way contribute to a decrease in the efficiency of compressing the attribute information. Thus, in this embodiment, the line attribute and the thin line attribute are regarded as the graphics attribute to which they are strongly related, and converted into the graphics attribute, in order to improve the efficiency of compressing the attribute information.

In Step S902, the management unit 221 determines whether the transfer condition is satisfied or not. Specifically, the management unit 221 checks whether the transfer performance satisfying the performance index of the printing apparatus 110 can be achieved with the attribute information in which the line attribute and the thin line attribute have been converted into the graphics attribute. The checking method is the same as that in Embodiment 1, and is therefore not described again here. The management unit 221 ends the attribute conversion processing upon determining that the transfer condition is satisfied, or proceeds to Step S903 upon determining that the transfer condition is not satisfied.

In Step S903, as second conversion processing, the management unit 221 converts the text attribute (0x3) and the small text attribute (0x7) in the attribute information into the background attribute (0xF). Here, as in Step S701 in FIG. 7 described in Embodiment 1, the efficiency of compressing the attribute information is improved by converting the attribute of a text having a complicated shape into the background attribute existing over a certain area.

In Step S904, the management unit 221 determines again whether the transfer condition is satisfied or not. Specifically, the management unit 221 checks whether the transfer performance satisfying the performance index of the printing apparatus 110 can be achieved with the attribute information in which the text attribute and the small text attribute have been converted into the background attribute. The management unit 221 ends the attribute conversion processing upon determining that the transfer condition is satisfied, or proceeds to Step S905 upon determining that the transfer condition is not satisfied.

In Step S905, as third conversion processing, the management unit 221 converts the graphics attribute (0x1) in the attribute information into the background attribute (0xF). As in Step S703 in Embodiment 1, the efficiency of compressing the attribute information is poor for the graphics attribute, compared to the photographic image attribute existing over a certain area. Thus, the efficiency of compressing the attribute information is improved by converting the graphics attribute into the background attribute, the graphics attribute including the line attribute and the thin line attribute converted thereinto in Step S901.

In Step S906, the management unit 221 determines again whether the transfer condition is satisfied or not. Specifically, the management unit 221 checks whether the transfer performance satisfying the performance index of the printing apparatus 110 can be achieved with the attribute information in which the graphics attribute has been converted into the background attribute. The management unit 221 ends the attribute conversion processing upon determining that the transfer condition is satisfied, or proceeds to Step S907 upon determining that the transfer condition is not satisfied.

In Step S907, as fourth conversion processing, the management unit 221 converts the photographic image attribute (0x0) in the attribute information into the background attribute (0xF). As in Step S705 in Embodiment 1, an object of the photographic image attribute often exists over a certain area and originally offers favorable compression efficiency. Thus, the photographic image attribute is the last attribute converted into the background attribute.

In Embodiment 1, all the conversion target attributes are converted into the background attribute and deleted from the attributed information. In this embodiment, on the other hand, conversion target attributes are converted into attributes to which the conversion target attributes are strongly related. Thus, the conversion target attributes are not completely deleted from the attribute information. In Embodiment 3, in a case where the transfer performance is achieved with a small number of conversions, many pieces of information in the attribute information effective for printing can be left and be inputted to the image processor 117, and therefore a high-quality printing result can be obtained.

Embodiment 4

In Embodiment 4, attribute information is converted by conversion processing different from that of any of Embodiments 1 to 3. The apparatuses configurations and processing flows can be the same as those of Embodiment 1, except for the points described below.

Figure 10:
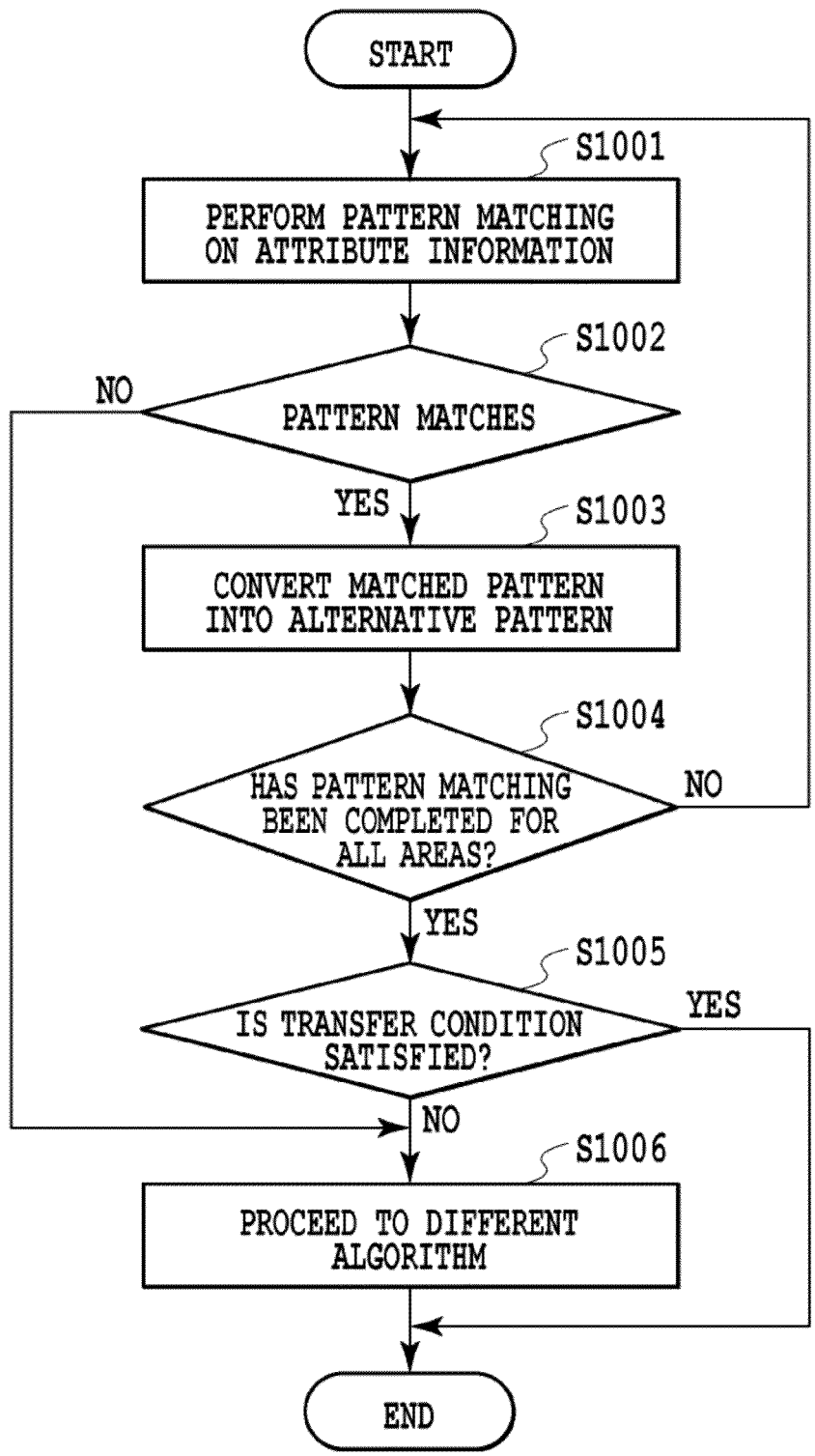
FIG. 10 is a flowchart showing an example of an attribute information conversion method in Embodiment 4 of the present invention.

FIG. 10 is a flowchart showing an attribute-information conversion method which is different from those of Embodiments 1 to 3 in the processing in Step S606 in FIG. 6. In this embodiment, an attribute sequence pattern which is easy to compress is prepared for an attribute sequence pattern which is hard to compress, as an alternative. Then, in a case where a hard-to-compress attribute sequence pattern is found in the attribute information, the attribute sequence pattern is converted into its alternative, easy-to-compress attribute sequence pattern.

Figures 11A, 11B:
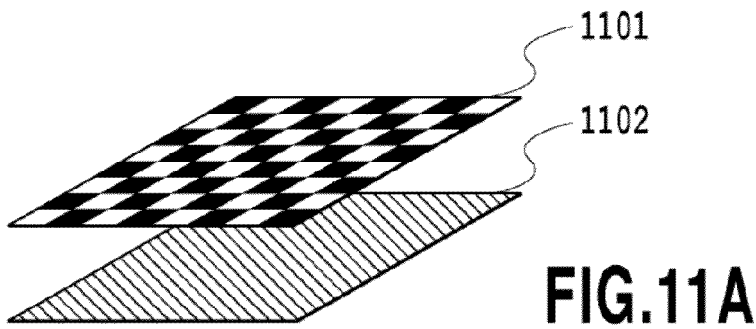
FIGS. 11A and 11B are diagrams showing an example of an attribute sequence pattern for which compression efficiency is poor and an example of its alternative sequence pattern, in Embodiment 4 of the present invention.

In Step S1001, the management unit 221 performs pattern matching processing on a certain area having the attribute information. Specifically, the management unit 221 performs pattern matching processing to detect whether the attribute information contains a hard-to-compress attribute sequence pattern. FIG. 11B shows a sequence pattern 1120 and a sequence pattern 1130, which are examples of, respectively, a hard-to-compress attribute sequence pattern and an easy-to-compress attribute sequence pattern which is prepared for the hard-to-compress sequence pattern. The hard-to-compress attribute sequence pattern 1120 occurs in a general electronic document. For example, overwriting a semitransparent graphics object 1101 on a photographic image object 1102 in FIG. 11A creates the attribute information having a checker pattern of the photographic image attribute (0x0) and the graphics attribute (0x1).

In Step S1002, the management unit 221 determines whether the certain area having the attribute information matches a predetermined pattern. Specifically, the management unit 221 determines whether the certain area having the attribute information matches the hard-to-compress attribute sequence pattern. The management unit 221 proceeds to Step S1003 upon determining that the certain area having the attribute information matches the hard-to-compress attribute sequence pattern 1120, or proceeds to Step S1006 upon determining that the certain area having the attribute information does not match the hard-to-compress attribute sequence pattern 1120.

In Step S1003, the management unit 221 converts the area having the attribute information matching the hard-to-compress attribute sequence pattern 1120, into the alternative, easy-to-compress attribute sequence pattern 1130.

In Step S1004, the management unit 221 determines whether the pattern matching processing has been performed on all the areas of the attribute information. The management unit 221 proceeds to Step S1005 upon determining that the pattern matching processing has been performed on all the areas, or proceeds to Step S1001, moving to another area in the attribute information to perform the pattern matching processing on that area.

In Step S1005, the management unit 221 determines whether the transfer condition is satisfied or not. Specifically, the management unit 221 checks whether the transfer performance satisfying the performance index of the printing apparatus 110 can be achieved with the attribute information in which the attribute sequence pattern has been converted into the alternative attribute sequence pattern. The checking method is the same as that described in Embodiment 1, and is therefore not described again here. The management unit 221 ends the attribute conversion processing upon determining that the transfer condition is satisfied, or proceeds to Step S1006 upon determining that the transfer condition is not satisfied.

In Step S1006, the management unit 221 performs the attribute conversion processing according to a different algorithm. The different algorithm can be the conversion processing of any one of Embodiments 1 to 3.

In a general case, an object used as the entire or part of the background of a page of an electronic document may be outputted as attribute information having a pattern like the hard-to-compress attribute sequence pattern 1120. However, in this case, the object used as the background is not important in printing.

In this embodiment, an attribute sequence pattern which is not important yet hard to compress is first converted into an easy-to-compress attribute sequence pattern. Thereby, attributes, such as text, line, graphics, and photographic image, which are important separately can remain in the attribute information. Consequently, many pieces of information in the attribute information that are effective in the printing can be inputted to the image processor 117, allowing a high-quality printing result to be obtained.

Embodiment 5

Described in Embodiment 5 is a case where the processing in Steps S1303 to S1307 in FIG. 13 does not satisfy the performance index of the printing apparatus 110, namely the PPM, creating bottlenecks in the performance of the printing apparatus 110. This embodiment describes an example where, in the step of compressing and transferring the image information and the like described in Embodiments 1 to 4, area information indicating an area having an attribute converted in the attribute information is added instead of the conversion history information. Then, this area information is used later in the image area separation by the printing apparatus 110 to enable faster image area separation processing. Although the text attribute is converted in this embodiment, the same approach applies to cases of converting other attributes as well. The apparatuses configurations and processing flows can be the same as those of Embodiment 1, except for the points described below.

Figure 16:
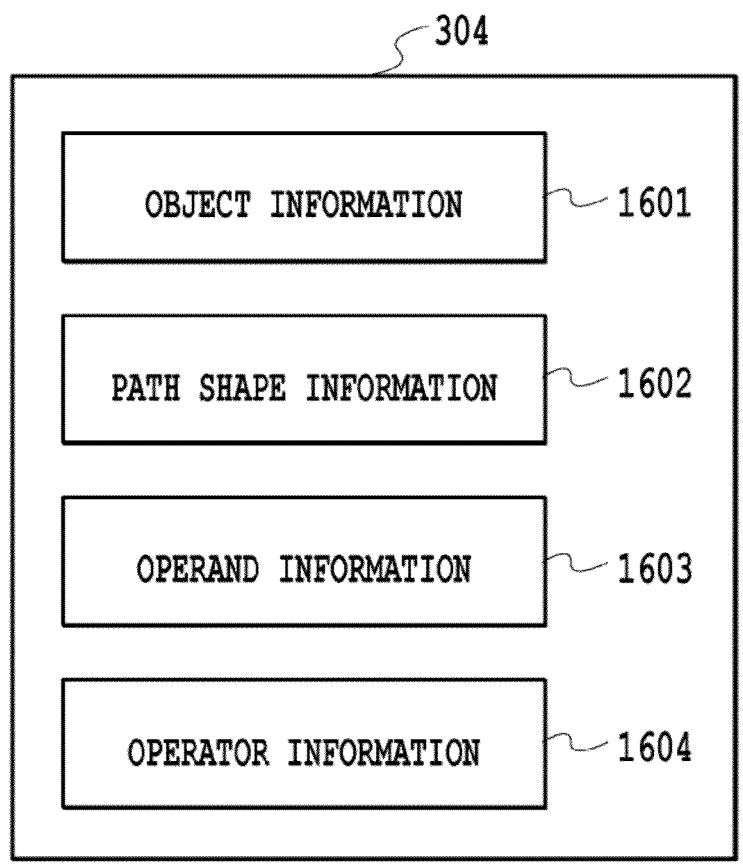
FIG. 16 is a diagram showing an example structure of a drawing command in Embodiment 5 of the present invention.

First, FIG. 16 shows an example of a detailed data structure of the drawing command 304 in FIG. 3. The drawing command 304 shown in FIG. 16 is formed by object information 1601, path shape information 1602, operand information 1603, and operator information 1604. The object information

1601 contains information indicating the type of an object, whether the object is a text object, a graphics object, or the like. In a case where the drawing command 304 does not contain the object information 1601, the type of the object may be analogically determined based on the path shape information 1602 shown next.

The path shape information 1602 is formed by information on the position and outline of an object, such as information on a drawing range of an object and path dot-sequence information representing the outline of the object with dot-sequence. The drawing unit 224 obtains the drawing range information and the outline information on the object from the path shape information 1602. In a case of a text object, the path shape information 1602 has information on the coordinates of a start position and the coordinates of an end position of the drawing range of the text object and information on a bitmap outline representing the text object.

The operand information 1603 contains information on drawing of the object. In a case, for example, where the object is a single-color fill, the drawing unit 224 generates, from the operand information 1603, fill information such as the color in which the object is painted.

The operator information 1604 contains information on the class of the object. From the operator information 1604, the drawing unit 224 obtains raster operation (ROP), an a value, mask information, and the like designated in this object, determines the level (class) of the object based on these pieces information, and generates level information.

Note that the above information pieces are an example of information contained in the drawing command, and the drawing command may contain other pieces of information.

Figure 17:
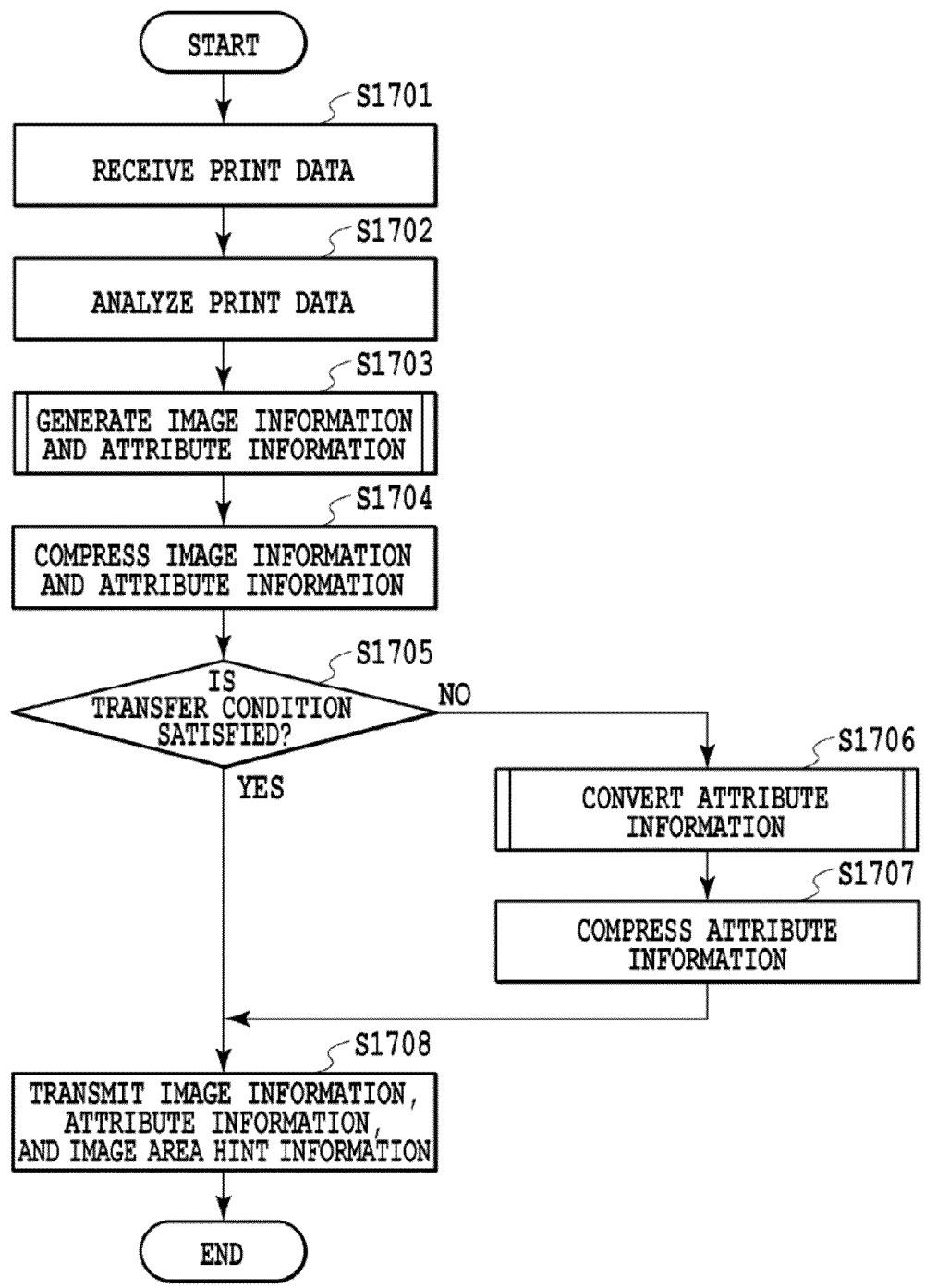
FIG. 17 is a flowchart showing an example of main processing performed by the print data processing apparatus in Embodiment 5 of the present invention.

FIG. 17 is a flowchart showing an example of processing performed by the software 220 of the print data processing apparatus 120 in this embodiment. Like the processing shown in FIG. 6, processing shown in FIG. 17 is implemented by the CPU 121 executing the programs stored in the ROM 123.

In Step S1701, the management unit 221 of the print data processing apparatus 120 receives print data through the network IF 124 by using the network control unit 222. The print data received here may be received from the printing apparatus 110 or from any other apparatus along with a control command to cause the printing apparatus 110 to print.

In Step S1702, the analysis unit 223 analyzes the print data received. As described earlier, the analysis unit 223 refers to the print data and outputs an analysis result.

Figure 18:
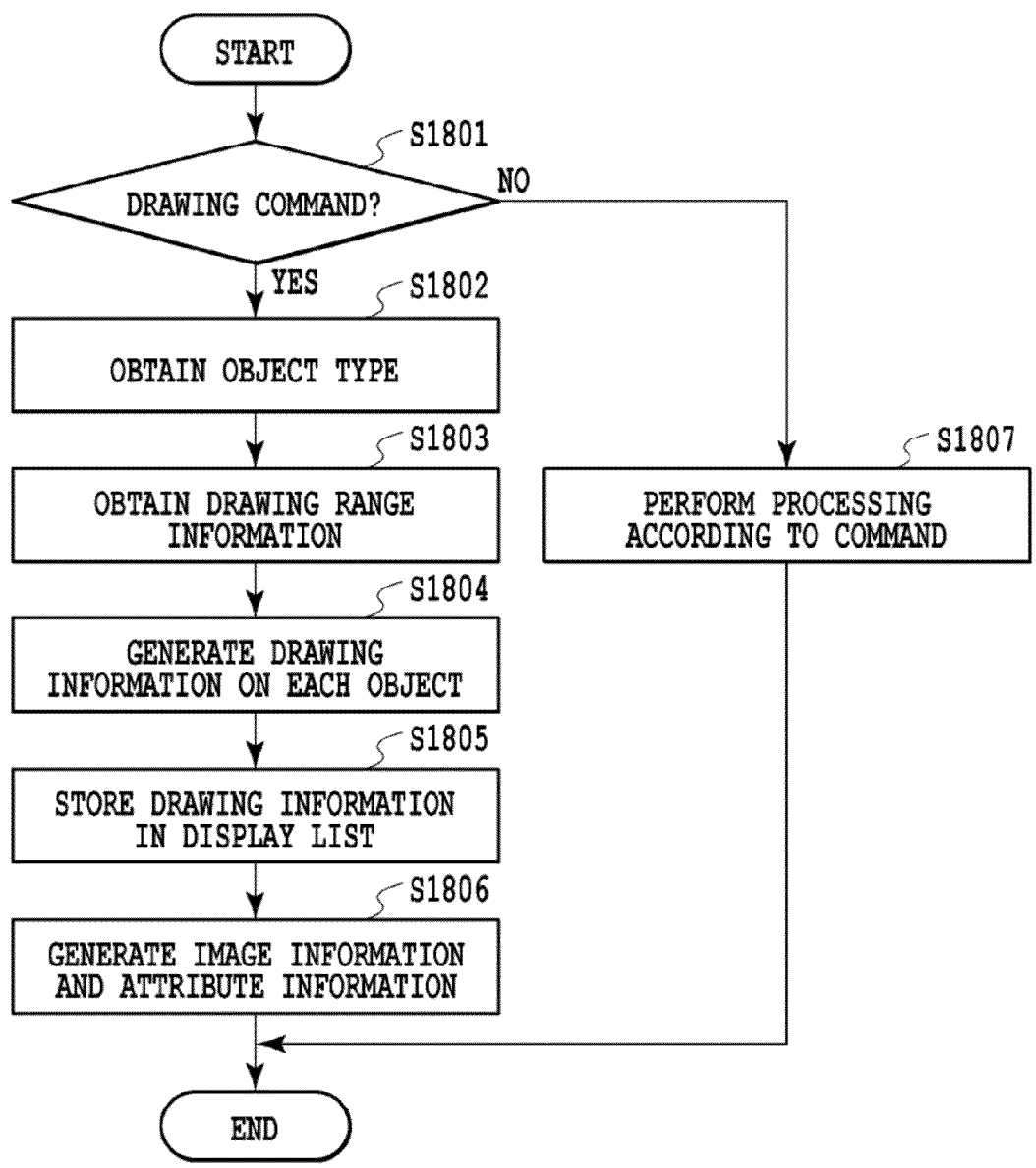
FIG. 18 is a flowchart showing an example of generating drawing information in Embodiment 5 of the present invention.
Figure 19:
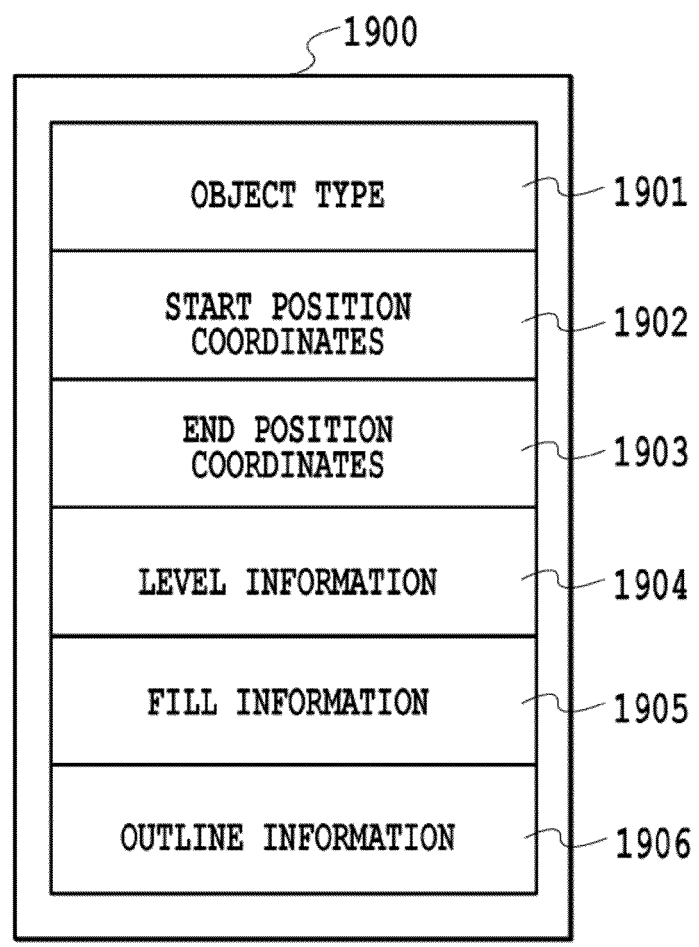
FIG. 19 is a diagram showing an example structure of the drawing information in Embodiment 5 of the present invention.

In Step S1703, the drawing unit 224 receives, as input, the analysis result derived by the analysis unit 223, and generates and outputs image information and attribute information like the ones illustrated in FIG. 4. FIG. 18 is a flowchart showing details of the processing in Step S1703. In this flow, the drawing unit 224 obtains the drawing range information and the outline information on the object from the drawing command 304 analyzed in Step S1702, and generates drawing information having a configuration such as one shown in FIG. 19. Drawing information 1900 in FIG. 19 is prepared for every object, and the prepared pieces of drawing information 1900 are put together as a display list 2000. Details of the display list 2000 will be described later. The drawing unit 224 outputs image information and attribute information like the ones illustrated in FIG. 4, based on the drawing information 1900. As in FIG. 17, the flow below is implemented by the CPU 121 executing the programs stored in the ROM 123.

In Step S1801, the drawing unit 224 determines whether the command being analyzed is a drawing command or not. The drawing unit 224 proceeds to Step S1802 upon determining that the command being analyzed is a drawing command, or proceeds to Step S1807 upon determining that the command being analyzed is not a drawing command. In Step S1807, in a case where the command being analyzed is, for example, a page start command 303a, the drawing unit 224 initializes parameters and activates modules necessary for generating page information.

In Step S1802, the drawing unit 224 obtains the type of the object from the object information 1601 in the drawing command 304.

In Step S1803, the drawing unit 224 obtains information on the drawing range of the object from the path shape information 1602. In a case of a text object, the drawing unit 224 obtains, from the path shape information 1602, the drawing range information represented by the coordinates of a start position and the coordinates of an end position.

In Step S1804, the drawing unit 224 generates the drawing information 1900 constituting the display list 2000 which will be needed later in drawing in Step S1806.

Figure 5:
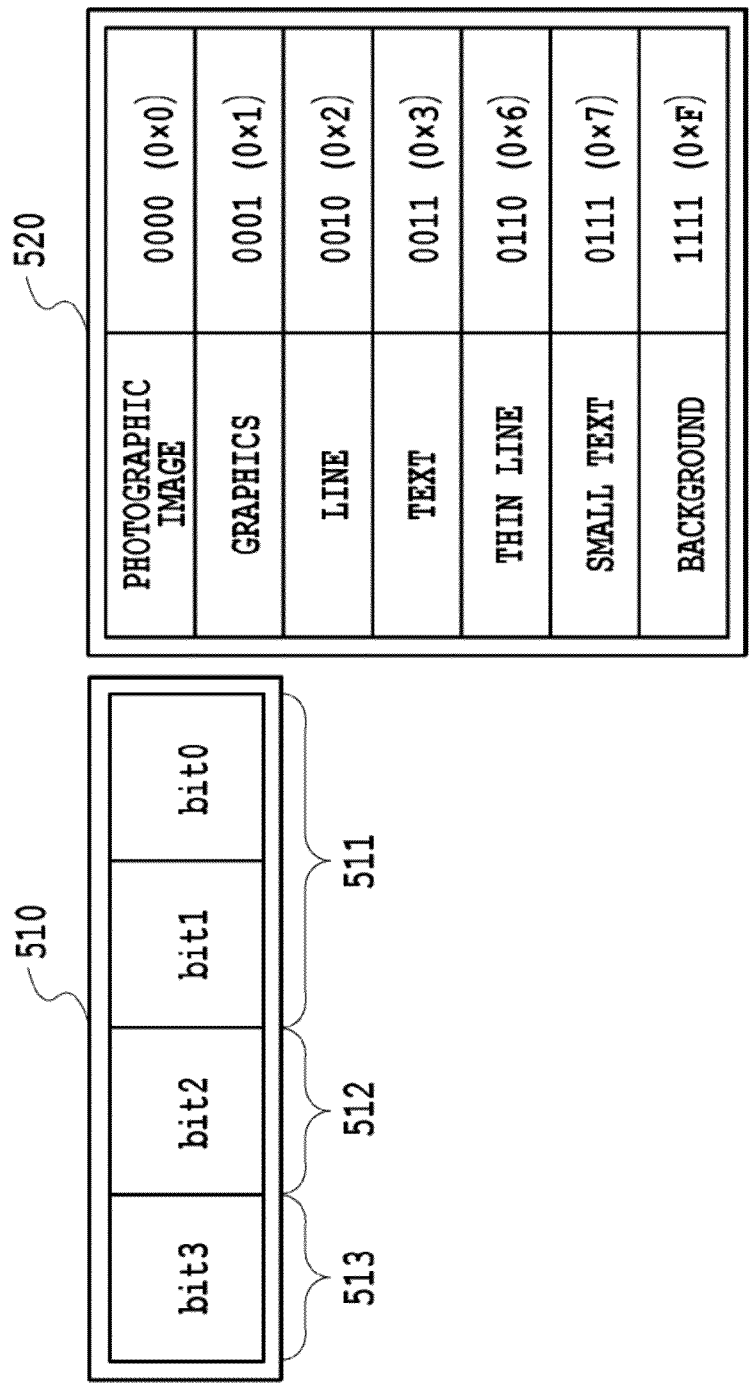
FIG. 5 is a diagram showing an example configuration of bit strings of the attribute information in Embodiment 1 of the present invention.

Specifically, the drawing unit 224 first stores the object type obtained in Step S1802 in object type information 1901. In a case of a text object, a bit string "0011" indicating a text object, illustrated in FIG. 5, is stored in the object type information 1901.

Next, the drawing unit 224 stores the drawing range information obtained in Step S1803 in start position coordinates 1902 and end portion coordinates 1903.

Next, the drawing unit 224 generates fill information 1905 from the operand information 1603. Note that information on the color or pattern in which the object is painted is stored in the fill information 1905.

Next, the drawing unit 224 generates level information 1904 from the operator information 1604. The level information 1904 represents an object within a page in the z-order. For example, in a case where an object of level 1 means that the object is written over an object of level 0. The level in the level information 1904 is determined according to, in principle, the order in which the object is received, while considering the ROP information and the like contained in the operator information 1604. In this example, the drawing unit 224 simply generates one level indicating that there is no overlapping object, and stores the level in the level information 1904.

Lastly, the drawing unit 224 generates outline information 1906 from the path shape information 1602. In a case of a text object, the text object is represented within the designated drawing range in bitmap format. An ID associated with bitmap information on the text object is set in the path shape information 1602, and the drawing unit 224 obtains, based on the ID, desired bitmap information from a DB having bitmap information on texts registered therein. The drawing unit 224 stores the obtained bitmap information in the outline information 1906.

Figure 20:
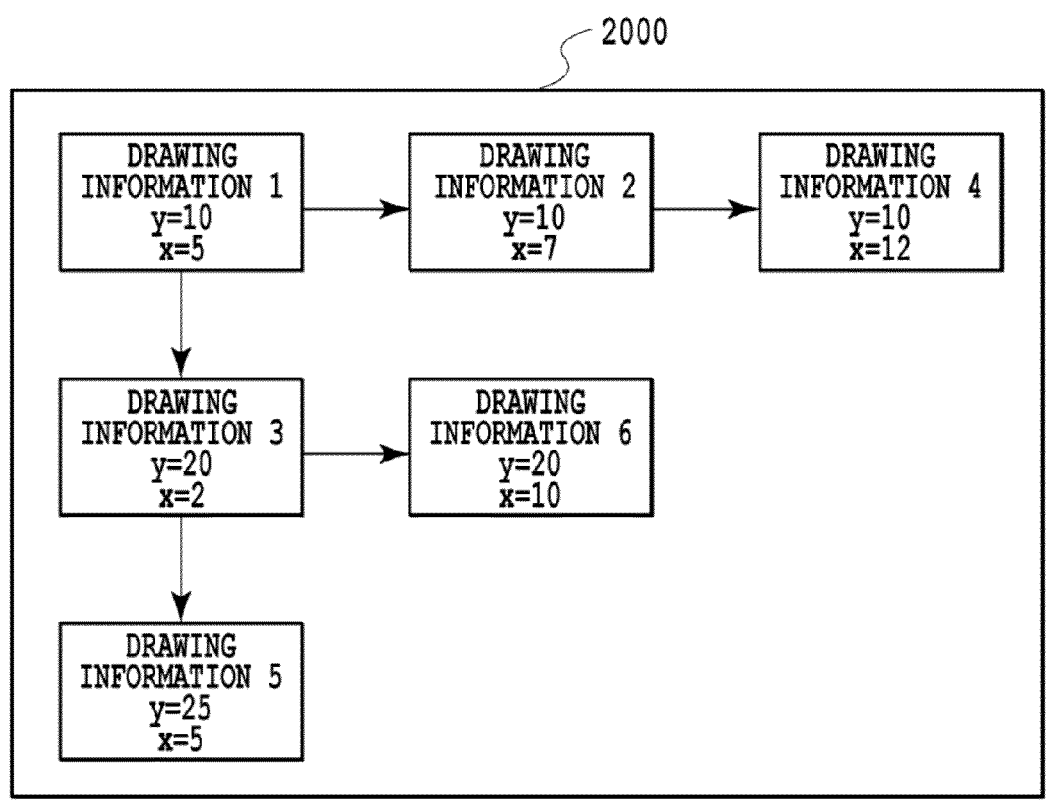
FIG. 20 is a diagram showing an example structure of a display list in Embodiment 5 of the present invention.

In step S1805, the drawing unit 224 stores the drawing information 1900 generated in Step S1804, in the display list 2000. FIG. 20 shows an example of the configuration of the display list 2000. The display list 2000 is a list in which the pieces of drawing information generated are linked. The display list 2000 is sorted in a Y-X manner based on the start position coordinates 1902 in the drawing information. The drawing unit 224 compares the start position coordinates 1902 of the drawing information 1900 generated in Step S1804 with the coordinates of each piece of the drawing information in the display list 2000, and stores the drawing information 1900 in the display list 2000 so that the drawing information 1900 may be sorted in a Y-X order.

In Step S1806, the drawing unit 224 performs rendering processing based on the display list 2000 generated in Step S1805, and thus generates image information and attribute information.

In Step S1704, the compression unit 225 compresses each of the image information and the attribute information outputted by the drawing unit 224. More specifically, the compression unit 225 compresses the image information lossily, and the attribute information losslessly. As described above, the attribute information represents the difference in information for each area clearly by bits. Thus, the lossless compression which does not lose information by decompression is employed for the attribute information. On the other hand, as for the image information, even in a case where information is lost in decompression, the lost information can be interpolated based on the image information and attribute information therearound. Thus, the lossy compression having higher compressibility is employed for the image information. Although the lossy compression is preferable for the image information in view of the performance in transfer, the image information may be compressed losslessly depending on the operation.

In Step S1705, the management unit 221 determines whether the transfer condition is satisfied or not, i.e., whether the transfer performance can be achieved. The transfer performance can be obtained by Formula 1, as in Embodiment 1. The determination of the transfer performance is the same as that in Embodiment 1, and is therefore not described again here. The management unit 221 proceeds to Step S1708 upon determining that the transfer condition is satisfied, or proceeds to Step S1706 upon determining that the transfer condition is not satisfied.

Upon determining in Step S1705 that the transfer condition is not satisfied, in Step S1706 the management unit 221 converts the attribute information outputted by the drawing unit 224, and generates image area hint information indicating the area information of the attribute converted. Details of this processing will be given later.

In Step S1707, the compression unit 225 compresses the converted attribute information losslessly.

Figure 21:
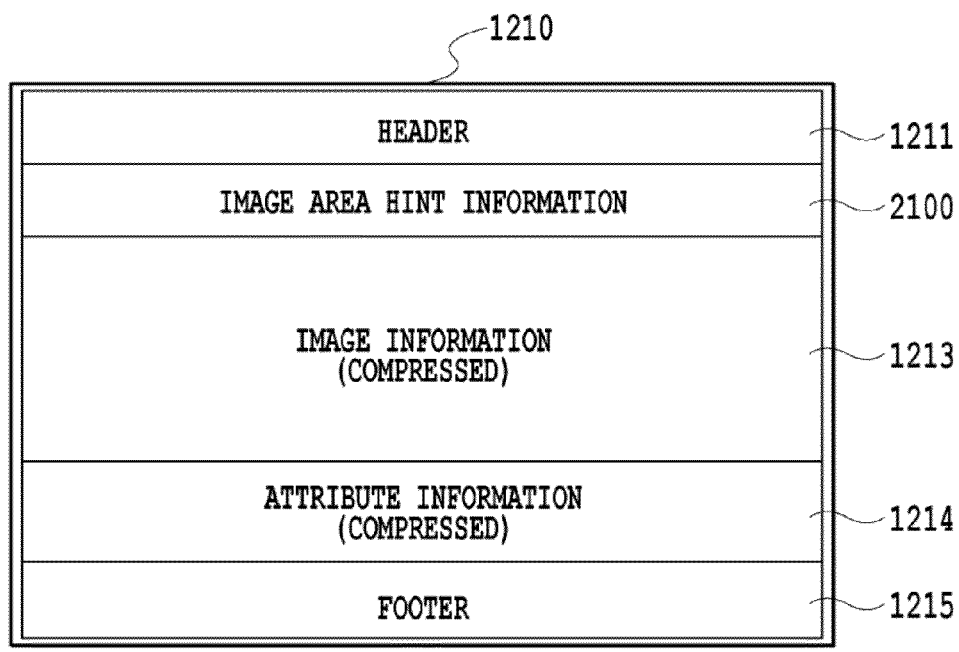
FIG. 21 is a diagram showing an example configuration of data transferred from the print data processing apparatus to the printing apparatus in Embodiment 5 of the present invention.

In Step S1708, the management unit 221 transfers the compressed image information and attribute information, as well as the image area hint information in a case where it is generated in Step S1706, to the printing apparatus 110 through the network IF 124 by using the network control unit 222. FIG. 21 shows an example configuration of transfer data 1210 containing the image area hint information. A header 1211 and a footer 1215 sandwich compressed image information 1213, compressed attribute information 1214, and image area hint information 2100. Details of the image area hint information will be given later using FIG. 23.

Figure 22:
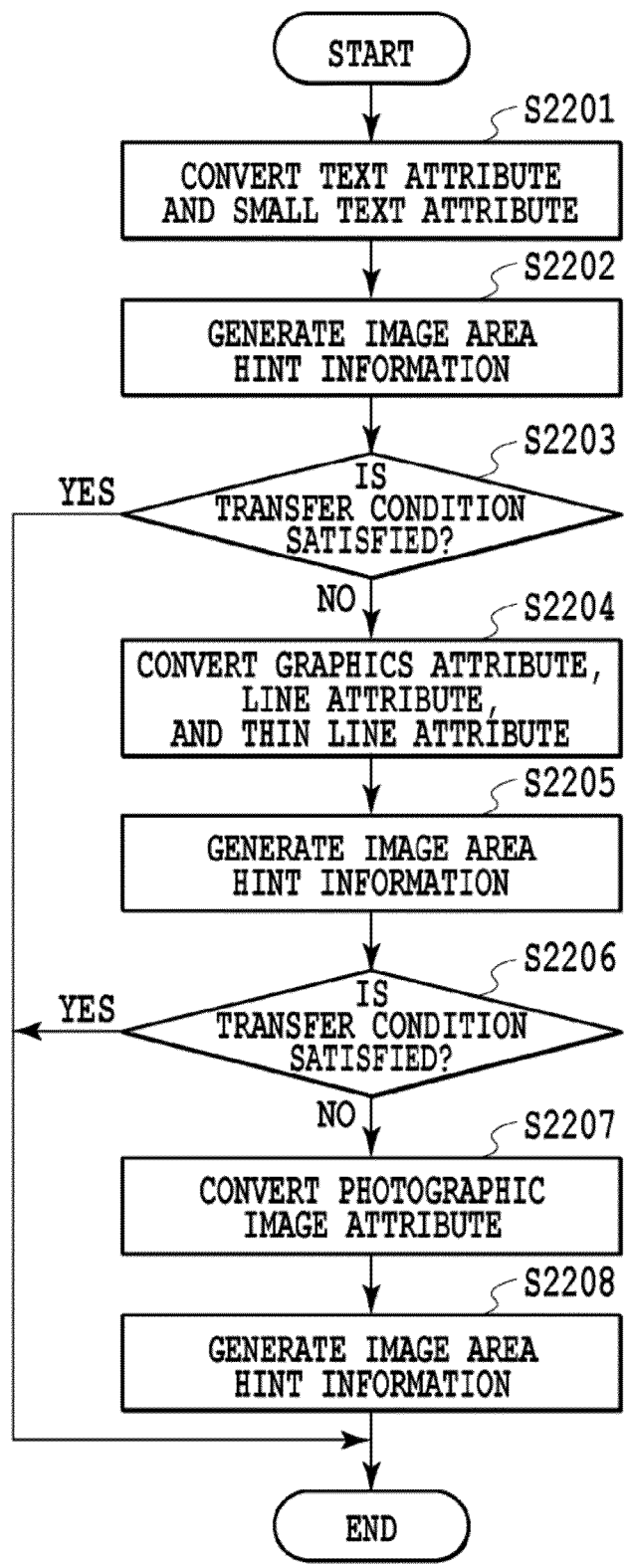
FIG. 22 is a diagram showing an example of a method of converting attribute information and a method of generating image area hint information in Embodiment 5 of the present invention.

Next, a method of the attribute conversion in Step S1706 is described in detail using a flowchart in FIG. 22. Generally, the efficiency of compression processing is higher for an attribute of a simple shape than for an attribute of a complicated shape. Thus, in this embodiment, the compression efficiency is improved by reducing an attribute of a complicated shape for which the compression efficiency is low.

In Step S2201, the management unit 221 converts all the text attribute (0x3) and the small text attribute (0x7) in the attribute information into the background attribute (0xF). Generally, a text in an electronic document is either the text attribute or the small text attribute. A text has a complicated shape, and contributes to a decrease in the efficiency of compressing the attribute information. On the other hand, an electronic document has many large background portions where no drawing is performed. Thus, in this embodiment, the text attribute (0x3) and the small text attribute (0x7) are converted into the background attribute (0xF) to improve the efficiency of compressing the attribute information.

In Step S2202, the management unit 221 generates image area hint information for each area having the converted text attribute and small text attribute. First, using FIG. 23, the image area hint information is described.

FIG. 23 is an example configuration of the image area hint information 2100. The image area hint information 2100 is formed of attribute type information 2301a indicating the type of attribute converted (such as text or photographic image) and start-position coordinates 2301b and end-position coordinates 2301c indicating vertexes of a rectangle drawing area having the attribute. Every time the management unit 221 generates the image area hint information in Step S2202, a table is added, in which the attribute type information 2301a, the start-position coordinates 2301b, and the end-position coordinates 2301c are associated with each other, such as one shown on a middle row 2302 or a bottom row 2303. For example, in Step S2202, the management unit 221 adds type of attribute converted in Step S2201 to the attribute type information 2301a. In other words, the attribute of the object before being converted is added to the attribute type information 2301a of the image area hint information.

From the display list 2000 used in S1703 for generation of the image information and the attribute information, the management unit 221 obtains drawing information corresponding to the converted attribute. For example, in a case where the converted attribute is the text attribute, the management unit 221 extracts, from the display list 2000, drawing information 1900 on an object whose object type information 1901 is "text" or "small text." Then, the management unit 221 obtains the start-position coordinates 1902 and the end-position coordinates 1903 in that drawing information 1900 as area information. The area information thus obtained is set as image area hint information, as shown on the middle line 2302. In Step S2202, the management unit 221 repeats this processing on every drawing information 1900, in the display list 2000, whose object type information 1901 indicates "text" or "small text."

In Step S2203, the management unit 221 determines whether the transfer condition is satisfied or not. More specifically, the management unit 221 checks whether the transfer performance satisfying the performance index of the printing apparatus 110 can be achieved with the attribute information in which the text attribute and the small text attribute have been converted into the background attribute. The checking method is the same as that in Steps S1705 to S1707 in FIG. 17, and is therefore not described again here. The management unit 221 proceeds to Step S2204 upon determining that the transfer condition is not satisfied, or ends the attribute conversion processing upon determining that the transfer condition is satisfied.

In Step S2204, the management unit 221 converts all the graphics attribute (0x1), the line attribute (0x2), and the thin line attribute (0x6) in the attribute information into the background attribute (0xF). Generally, a figure, a halftone consisting of large and small dots, a ruled line, a broken like, and the like are any of the graphics attribute, the line attribute, and the thin line attribute. Objects of these attributes are scattered on a page of an electronic document and sometimes have complicated shapes. Thus, the efficiency of compressing the attribute information is poor for objects of those attributes, compared to objects of the photographic image attribute existing over a certain area, as will be described later. For this reason, in this embodiment, after the first conversion processing targeting the text attribute (0x3) and the small text attribute (0x7), the graphics attribute (0x1), the line attribute (0x2), and the thin line attribute (0x6) are converted into the background attribute (0xF) as second conversion processing, to improve the efficiency of compressing the attribute information.

In Step S2205, the management unit 221 generates image area hint information for each area having the graphics attribute, the line attribute, and the thin line attribute that have been converted. Contents of the processing are the same as those in Step S2202, and are therefore not described again here.

In Step S2206, the management unit 221 determines again whether the transfer condition is satisfied or not. More specifically, the management unit 221 checks whether the transfer performance satisfying the performance index of the printing apparatus 110 can be achieved with the attribute information in which the graphics attribute, the line attribute, and the thin line attribute have been converted into the background attribute. The management unit 221 proceeds to Step S2207 upon determining that the transfer condition is not satisfied, or ends the attribute conversion processing upon determining that the transfer condition is satisfied.

Upon determining in Step S2206 that the transfer condition is not satisfied, in Step S2207 the management unit 221 converts the photographic image attribute (0x1) into the background attribute (0xF) as third conversion processing. Generally, a photographic image in an electronic document is an object of the photographic image attribute. An object of the photographic image attribute tends to exist over a certain area, and the compression efficiency is originally favorable. For this reason, in this embodiment, the photographic image attribute is the last attribute to be converted into the background attribute.

In Step S2208, the management unit 221 generates image area hint information for each area having the photographic image attribute converted. Contents of processing are the same as those in S2202, and are therefore not described again here.

Figure 24:
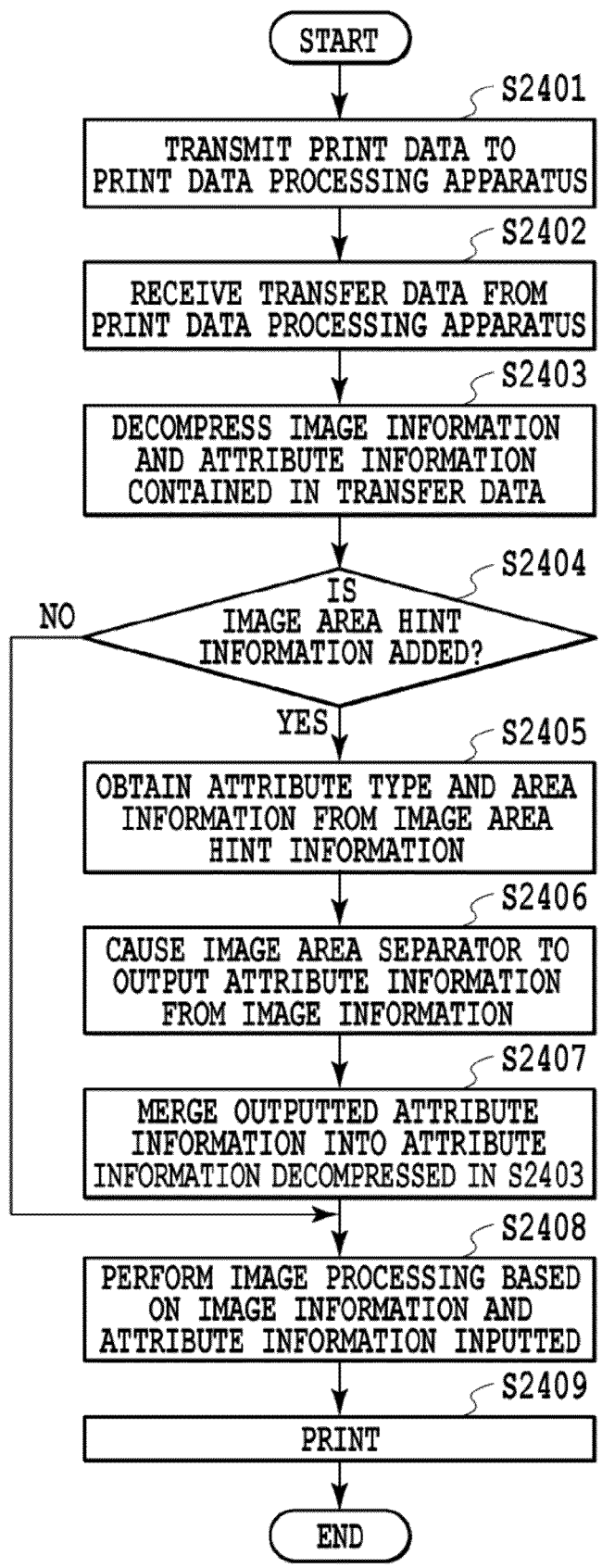
FIG. 24 is a flowchart showing an example of a series of processing performed by the printing apparatus in Embodiment 5 of the present invention.

FIG. 24 is a flowchart showing processing by the software 210 of the printing apparatus in this embodiment. Processing in FIG. 24 is implemented by the CPU 111 executing the programs stored in the ROM 112.

In Step S2401, the management unit 211 transfers print data received by the printing apparatus 110 to the print data processing apparatus 120 through the network IF 115 by using the network control unit 212. Note that the processing in Step S2401 is not essential, and the processing may start from Step S2402. To be more specific, the printing apparatus 110 may perform processing described below, using data transmitted from the print data processing apparatus 120 without transmitting print data to the print data processing apparatus 120.

In Step S2402, the management unit 211 receives transfer data transmitted by the print data processing apparatus 120, by using the network control unit 212. In this embodiment, the transfer data is, for example, the data shown in FIG. 21.

Since the image information 1213 and the attribute information 1213 contained in the transfer data received in Step S2402 have been compressed, in Step S2403 the decompression processor control unit 215 causes the decompression processor 114 to decompress the compressed image information and the compressed attribute information.

In Step S2404, the management unit 211 determines whether the transfer data received has the image area hint information 2100 added thereto, thereby determining whether the attribute information has been converted by the print data processing apparatus 120 or not. The management unit 211 proceeds to Step S2405 upon determining that the image area hint information 2100 is added, or proceeds to Step S2408 upon determining that the image area hint information 2100 is not added.

In Step S2405, the management unit 211 obtains the attribute type information 2301a, the start-position coordinates 2301b, and the end-position coordinates 2301c from the image area hint information 2100.

In Step S2406, the image area separator control unit 213 inputs, to the image data separator 116, a rectangle area in the image information decompressed in Step S2403, the rectangle area being represented by the start-position coordinates 2301b and the end-position coordinates 2301c obtained in Step S2405. The image area separator 116 outputs attribute information on the rectangle area. The processing performed by the image area separator 116 in Step S2406 is the same as that in Embodiment 1, and is therefore not described again here.

In Step S2407, the management unit 211 merges the attribute information outputted in Step S2406 into the attribute information decompressed in Step S2403 to create new attribute information. In other words, the management unit 211 updates the attribute information decompressed in Step S2403 by using the attribute information outputted in Step S2406.

In Step S2408, the image processor control unit 214 receives as input the image information decompressed in Step S2403 and the attribute information decompressed in Step S2403 or the attribute information obtained by the merging in Step S2407, and causes the image processor 117 to perform image processing.

In Step S2409, the management unit 211 passes a result of the image processing derived in Step S2408 to the engine control unit 216, which causes the engine 118 to print.

Generally, the performance of the image area separation processing is proportional to the size of an area processed. In this embodiment, the size of an area in the decompressed image information subjected to the image area separation processing is smaller than those in Embodiments 1 to 4. Thus, the performance in the image area separation processing can be improved. Advantageous effects of this embodiment are described using FIG. 25.

FIG. 25 shows a table of advantageous effects provided under an evaluation environment 2500 in which the printing apparatus performance index is 30 PPM, the network bandwidth is 5 MB/sec, and the transfer data having ten pages each being 12 MB in size are inputted. The transfer performance under this environment is found to be 10 MB by Formula 1. Further, the attribute conversion is performed on an area half the size of a page. Each stage of the display list generation processing, the image transfer processing, the image area separation processing, and the print processing can be performed in a pipeline. Moreover, in order for the processing apparatus performance index to satisfy 30 PPM, all the stages in the pipeline of the display list generation processing, the image transfer processing, the image area separation processing, and the print processing need to be 2 seconds or less.

A top row 2501 shows an example where neither the attribute conversion processing nor the addition of the image area hint information of this embodiment is performed. In the top row 2501, while the display list generation processing, the image area separation processing, and the print processing satisfy the PPM, the transfer performance<the transfer data size in the image transfer processing, making an average printing speed per page be 3 seconds. For this reason, the image transfer processing creates bottlenecks in the performance of the printing apparatus 110, so that the printing apparatus performance index cannot be achieved.

A middle row 2502 shows an example where the attribute conversion processing described in Embodiments 1 to 4 is performed, but the image area hint information described in this embodiment is not added. In the middle row 2502, the display list generation processing and the print processing satisfy the PPM, and owing to the attribute conversion processing, the image area separation processing, too, satisfy the PPM. However, the image area separation processing takes 3 seconds, making the average print speed per page 3 seconds. Thus, the printing apparatus performance index is not satisfied.

A bottom row 2503 shows an example where the attribute conversion processing as well as the addition of the image area hint information indicating area information on converted attributes, described in this embodiment, are performed. In the bottom row 2503, like the middle row 2502, the display list generation processing and the print processing satisfy the PPM, and owing to the attribute conversion processing, the image area separation processing, too, satisfy the PPM. Moreover, the image area separation processing takes only 1.5 seconds, which is half of time required by the processing in the middle row 2502, depending on the size of each area subjected to the image area separation processing. For this reason, the average print speed per page is 2 seconds, achieving a satisfactory printing apparatus performance index.

According to the processing in this embodiment, the print data processing apparatus 120 transfers, to the printing apparatus 110, transfer data having added thereto information indicating an area on which the attribute conversion has been performed. This allows the printing apparatus 110 to identify an area to perform the image area separation, and to therefore perform the image area separation only on necessary areas. Thus, the printing apparatus 110 can print while satisfying its performance index, the PPM.

Embodiment 6

In Embodiment 6, the use of the image area hint information in Embodiment 5 to increase the processing speed is applied to Embodiment 2. The apparatuses configurations and processing flows can be the same as those of Embodiment 5, except for the points described below.

Figure 26:
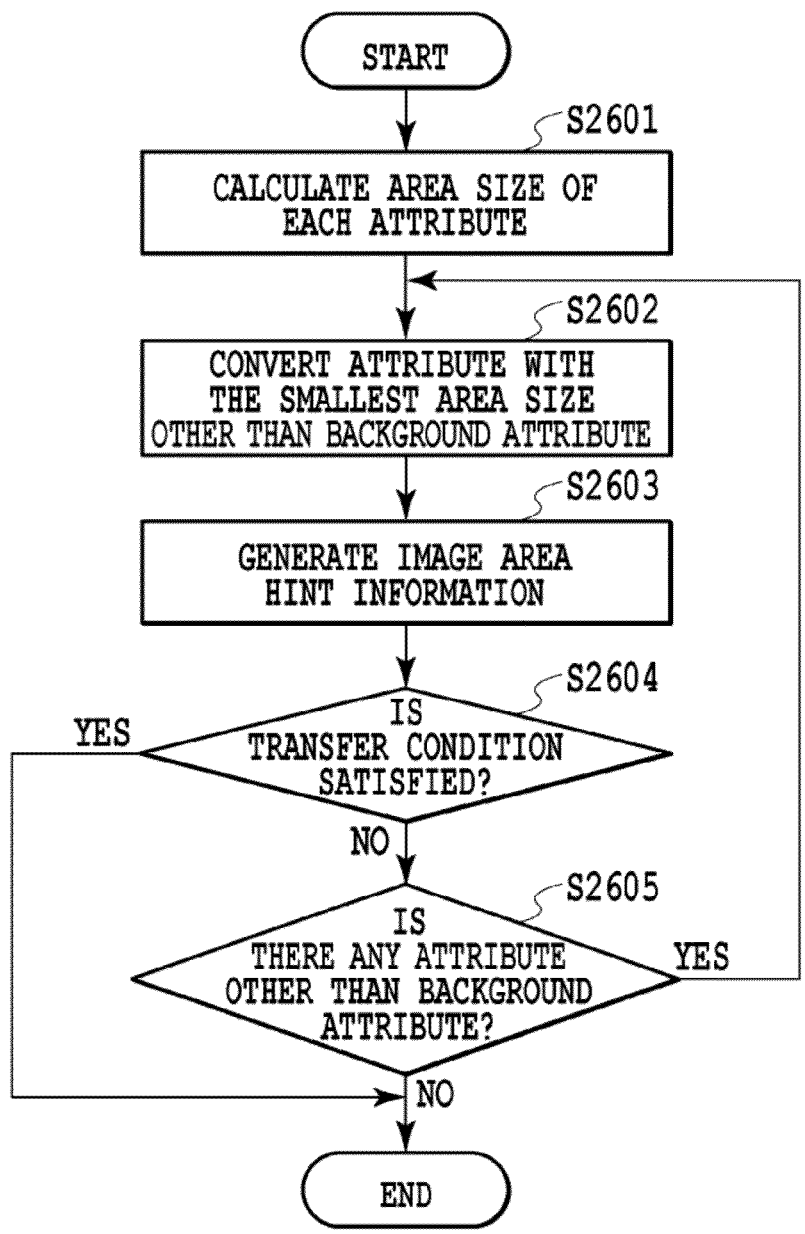
FIG. 26 is a diagram showing an example of a method of converting attribute information and a method of generating image area hint information in Embodiment 6 of the present invention.

FIG. 26 is a flowchart showing a method of attribute information conversion different from that of Embodiment 5 in the processing in Step S1706 in FIG. 17. In Embodiment 6, based on an idea that, in the attribute information, an attribute with a small area size is not as important as an attribute with a large area size, attribute conversion into the background attribute is performed sequentially from an attribute with a smallest area size.

In Step S2601, the management unit 221 of the print data processing apparatus 120 calculates the area size of each attribute contained in the attribute information.

In Step S2602, the management unit 221 converts an attribute whose area size is the smallest among all the attributes, except for the background, in the attribute information into the background attribute (0xF).

In Step S2603, the management unit 221 generates image area hint information for the area having the attribute which has the smallest area size and has been converted. Contents of the processing of generating the image area hint information is the same as that in Step S2202, and are therefore not described again here.

In Step S2604, the management unit 221 determines whether the transfer condition is satisfied or not. Specifically, the management unit 221 checks whether the transfer performance satisfying the performance index of the printing apparatus 110 can be achieved with the attribute information in which the attribute with the smallest area size has been converted into the background attribute. The checking method is the same as that described in Embodiment 5, and is therefore not described again here. The management unit 221 ends the attribute conversion processing upon determining that the transfer condition is satisfied, or proceeds to Step S2605 upon determining that the transfer condition is not satisfied.

In Step S2605, the management unit 221 determines whether there is any attribute in the current attribute information other than the background attribute. The management unit 221 proceeds to Step S2602 upon determining that there is any attribute in the current attribute information other than the background attribute, or ends the attribute conversion processing upon determining that there is no other attribute.

Compared to Embodiment 5 in which the attribute conversion is performed in a predetermined order, in Embodiment 6 the attribute of an object whose area to be printed is large in size tends to remain. In a case where the transfer performance is achieved with a small number of conversions, the difference in the attribute information between before and after the conversion is little, which allows many pieces of information effective for printing to be inputted to the image processor 117, and consequently allows a high-quality printing result to be obtained. Moreover, in this embodiment, the print data processing apparatus 120 transfers, to the printing apparatus 110, transfer data having added thereto information indicating an area on which the attribute conversion has been performed. This allows the printing apparatus 110 to identify an area to perform the image area separation, and to therefore perform the image area separation only on necessary areas. Thus, the printing apparatus 110 can print while satisfying its performance index, the PPM.

Embodiment 7

In Embodiment 7, the use of image area hint information in Embodiment 5 to increase the processing speed is applied to Embodiment 3. The apparatuses configurations and processing flows can be the same as those of Embodiment 5, except for the points described below.

Figure 27:
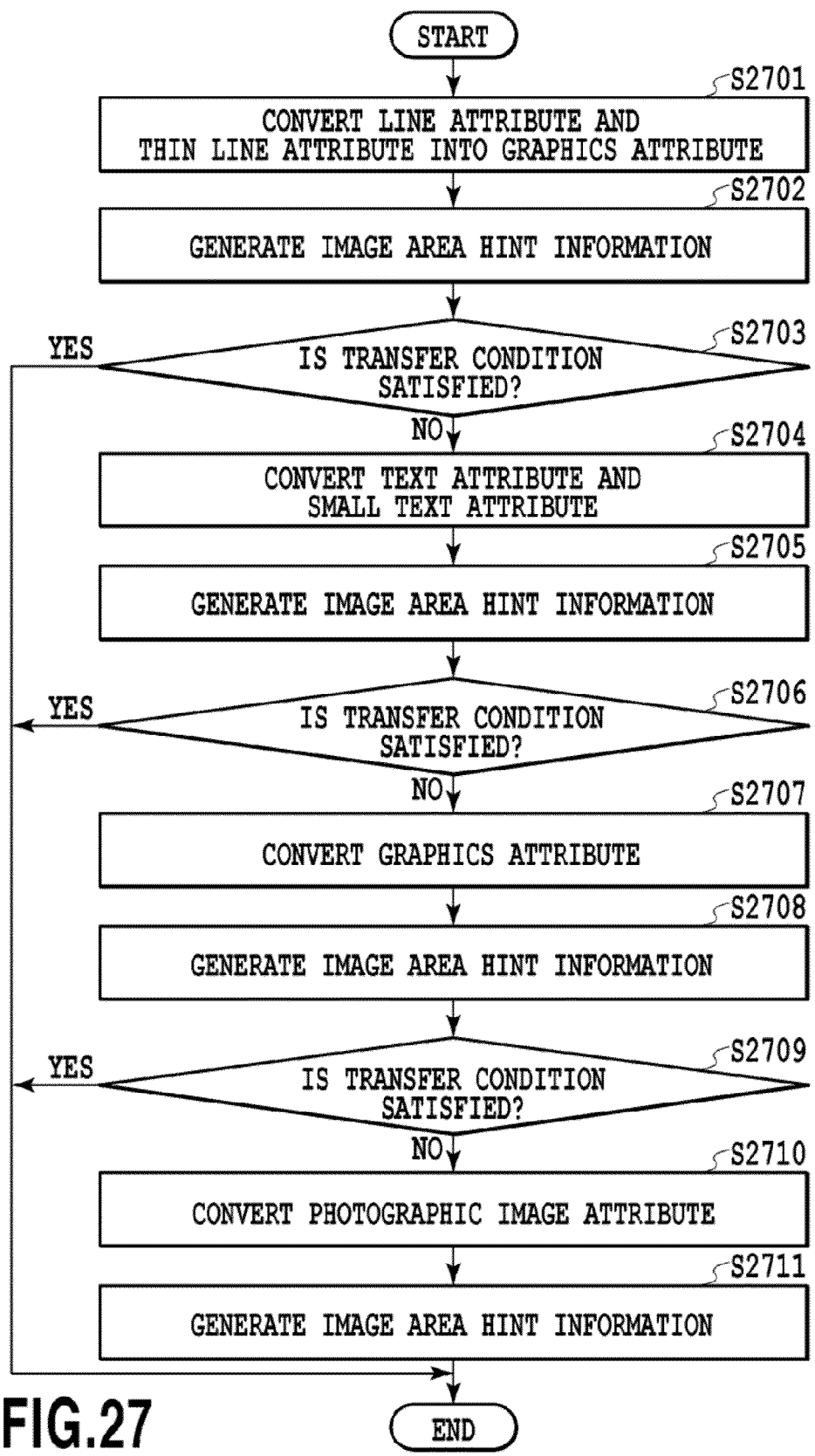
FIG. 27 is a diagram showing an example of a method of converting attribute information and a method of generating image area hint information in Embodiment 7 of the present invention.

FIG. 27 is a flowchart showing a method of attribute information conversion different from those of Embodiments 5 and 6 in the processing in Step S1706 in FIG. 17. Objects of strongly related attributes are often located adjacent to each other. In this embodiment, the efficiency of compressing the attribute information is improved by putting those attributes together into one attribute at the beginning.

In Step S2701, as first conversion processing, the management unit 221 converts the line attribute (0x2) and the thin line attribute (0x6) in the attribute information into the graphics attribute (0x1). In a general electronic document, as described above, the graphics attribute is strongly related to the line attribute and the thin line attribute, and the outline of an object of the graphics attribute is often represented by an object of the line attribute or the thin line attribute. In this case, the graphics attribute and the line attribute or the thin line attribute being adjacent to each other in a complicated way contribute to a decrease in the efficiency of compressing the attribute information. Thus, in this embodiment, the line attribute and the thin line attribute are regarded as the graphics attribute to which they are strongly related, and converted into the graphics attribute, in order to improve the efficiency of compressing the attribute information.

In Step S2702, the management unit 221 generates image area hint information for each area having the line attribute and the thin line attribute which have been converted. Contents of the processing of generating the image area hint information are the same as that in Step S2202, and are therefore not described again here.

In Step S2703, the management unit 221 determines whether the transfer condition is satisfied or not. Specifically, the management unit 221 checks whether the transfer performance satisfying the performance index of the printing apparatus 110 can be achieved with the attribute information in which the line attribute and the thin line attribute have been converted into the graphics attribute. The checking method is the same as that in Embodiment 5, and is therefore not described again here. The management unit 221 ends the attribute conversion processing upon determining that the transfer condition is satisfied, or proceeds to Step S2704 upon determining that the transfer condition is not satisfied.

In Step S2704, as second conversion processing, the management unit 221 converts the text attribute (0x3) and the small text attribute (0x7) in the attribute information into the background attribute (0xF). Here, like in Step S2201 in FIG. 22 described in Embodiment 5, the efficiency of compressing the attribute information is improved by converting the attributes of texts having complicated shapes into the background attribute existing over a certain area.

In Step S2705, the management unit 221 generates image area hint information for each area having the text attribute and the small text attribute which have been converted. Contents of the processing of generating the image area hint information are the same as that in Step S2202, and are therefore not described again here.

In Step S2706, the management unit 221 determines again whether the transfer condition is satisfied or not. Specifically, the management unit 221 checks whether the transfer performance satisfying the performance index of the printing apparatus 110 can be achieved with the attribute information in which the text attribute and the small text attribute have been converted into the background attribute. The management unit 221 ends the attribute conversion processing upon determining that the transfer condition is satisfied, or proceeds to Step S2707 upon determining that the transfer condition is not satisfied.

In Step S2707, as third conversion processing, the management unit 221 converts the graphics attribute (0x1) in the attribute information into the background attribute (0xF). As in Step S2204 in Embodiment 5, the efficiency of compressing the attribute information is poor for the graphics attribute, compared to the photographic image attribute existing over a certain area. Thus, the efficiency of compressing the attribute information is improved by converting the graphics attribute into the background attribute, the graphics attribute including the line attribute and the thin line attribute converted thereinto in Step S2701.

In Step S2708, the management unit 221 generates image area hint information for each area having the graphics attribute which has been converted. Contents of the processing of generating the image area hint information are the same as that in Step S2202, and are therefore not described again here.

In Step S2709, the management unit 221 determines again whether the transfer condition is satisfied or not. Specifically, the management unit 221 checks whether the transfer performance satisfying the performance index of the printing apparatus 110 can be achieved with the attribute information in which the graphics attribute has been converted into the background attribute. The management unit 221 ends the attribute conversion processing upon determining that the transfer condition is satisfied, or proceeds to Step S2710 upon determining that the transfer condition is not satisfied.

In Step S2710, as fourth conversion processing, the management unit 221 converts the photographic image attribute (0x0) in the attribute information into the background attribute (0xF). As in Step S2207 in Embodiment 5, an object of the photographic image attribute often exists over a certain area and originally offers favorable compression efficiency. Thus, the photographic image attribute is the last attribute converted into the background attribute.

In Step S2711, the management unit 221 generates image area hint information for each area having the photographic image attribute which has been converted. Contents of the processing of generating the image area hint information are the same as that in Step S2202, and are therefore not described again here.

In Embodiment 5, all the conversion target attributes are converted into the background attribute and deleted from the attributed information. In this embodiment, on the other hand, a conversion target attribute is converted into an attribute to which the conversion target attribute is strongly related. Thus, the conversion target attribute is not completely deleted from the attribute information. In Embodiment 7, in a case where the transfer performance is achieved with a small number of conversions, many pieces of information in the attribute information effective for printing can be left and be inputted to the image processor 117, and therefore a high-quality printing result can be obtained. Moreover, also in this embodiment, the print data processing apparatus 120 transfers, to the printing apparatus 110, transfer data having added thereto information indicating an area on which the attribute conversion has been performed. This allows the printing apparatus 110 to identify an area to perform the image area separation, and to therefore perform the image area separation only on necessary areas. Thus, the printing apparatus 110 can print while satisfying its performance index, the PPM.

Embodiment 8

In Embodiments 1 to 4, the image area separation processing is performed on the entire decompressed image information. In Embodiments 5 to 7, the image area separation processing is performed on the entire area identified by the image area hint information. In Embodiment 8, the image area separation processing is not performed on an area having a single attribute (where multiple different attributes do not overlap) because an attribute of the area having a single attribute can be identified based on the attribute type information contained in the image area hint information. The speed of processing performed by the printing apparatus 110 can be increased by not performing the image area separation processing on the area having a single attribute. Although the text attribute is converted in this embodiment, the same approach can be applied to cases of converting other attributes. The apparatuses configurations and processing flows can be the same as those of Embodiment 5, except for the points described below.

Figure 28:
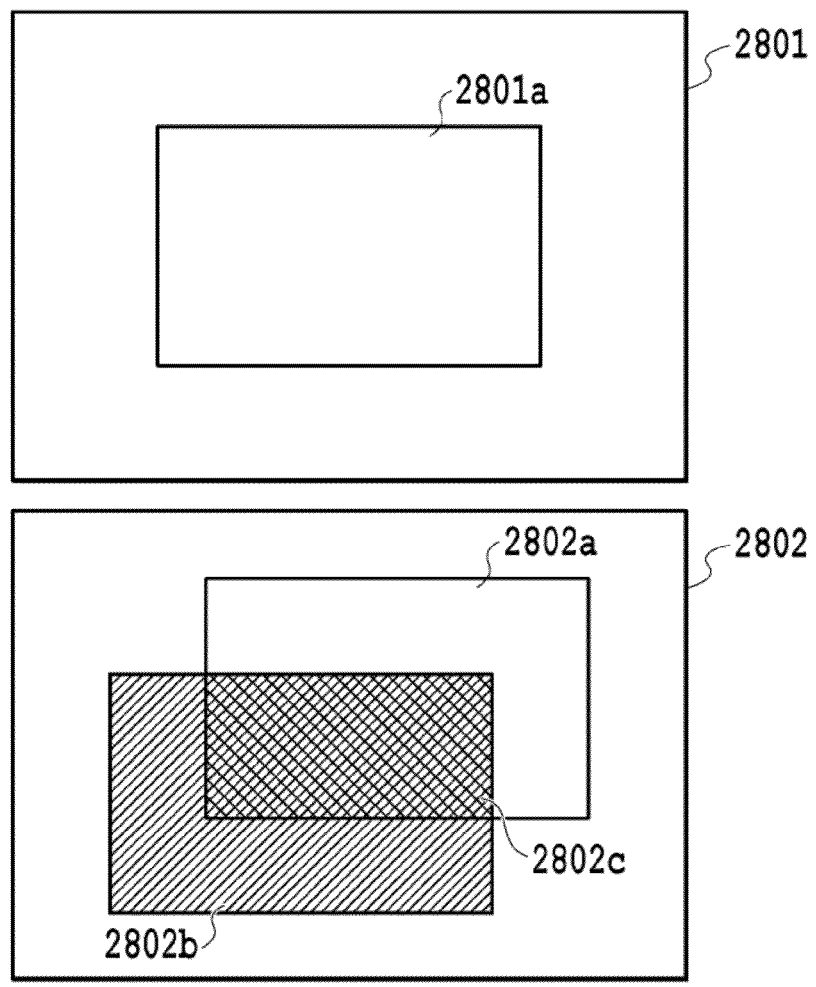
FIG. 28 is a diagram showing an example of a single-attribute area having a single attribute and an area having overlapping attributes in Embodiment 8 of the present invention.

FIG. 28 illustrates a case where only a single attribute exists in a certain area (single-attribute area) and a case where multiple attributes overlap (multiple-attribute area). A single-attribute area means that there is no other attribute behind a certain area.

In a page 2801, a rectangle area 2801a has no attribute therebehind, but only background. Thus, the rectangle area 2801a can be said to have a single attribute.

In a page 2802, a rectangle area 2802a has part of a rectangle area 2802b therebehind. In this case, XOR areas of the rectangle area 2802a and the rectangle area 2802b (an area of the rectangle area 2802a not overlapping the rectangle area 2802b and an area of the rectangle area 2802b not overlapping the rectangle area 2802a) can be said to be areas having only a single attribute. An AND area of the rectangle area 2802a and the rectangle area 2802b (an area where the rectangle area 2802a and the rectangle area 2802b overlap each other) has multiple attributes. A rectangle area 2802c represents the AND area.

In this embodiment, even faster processing is achieved by further adding, to the image area hint information described in Embodiment 5, information indicating whether the attribute is a single attribute or not, so that an area on which the printing apparatus 110 performs the image area separation processing can be reduced based on that information.

Figure 29B:
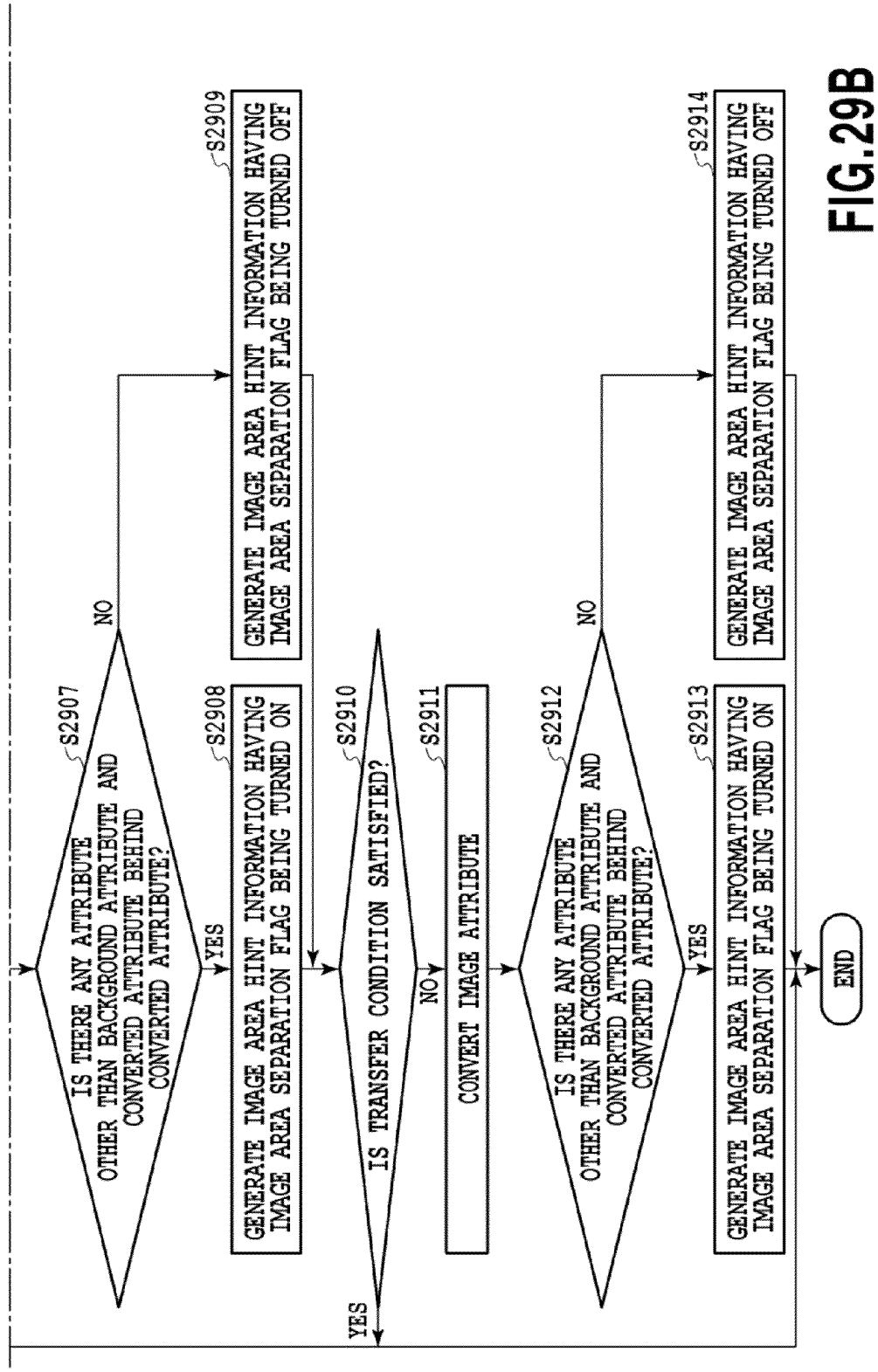

First, a flow of adding the information indicating whether an attribute is a single attribute or not to the image area hint information is shown in FIG. 29. FIG. 29 is a flowchart illustrating a method of determining whether an attribute is a single attribute or not and a method of adding information indicative thereof, in the attribute conversion processing in Step S1706 and in the processing of generating the image area hint information.

In Step S2901, the management unit 221 converts all the text attribute (0x3) and the small text attribute (0x7) into the background attribute (0xF). Generally, a text in an electronic document is either the text attribute or the small text attribute. A text has a complicated shape, and contributes to a decrease in the efficiency of compressing the attribute information. On the other hand, an electronic document has many large background portions where no drawing is performed. Thus, in this embodiment, the text attribute (0x3) and the small text attribute (0x7) are converted into the background attribute (0xF) to improve the efficiency of compressing the attribute information.

Figure 30:
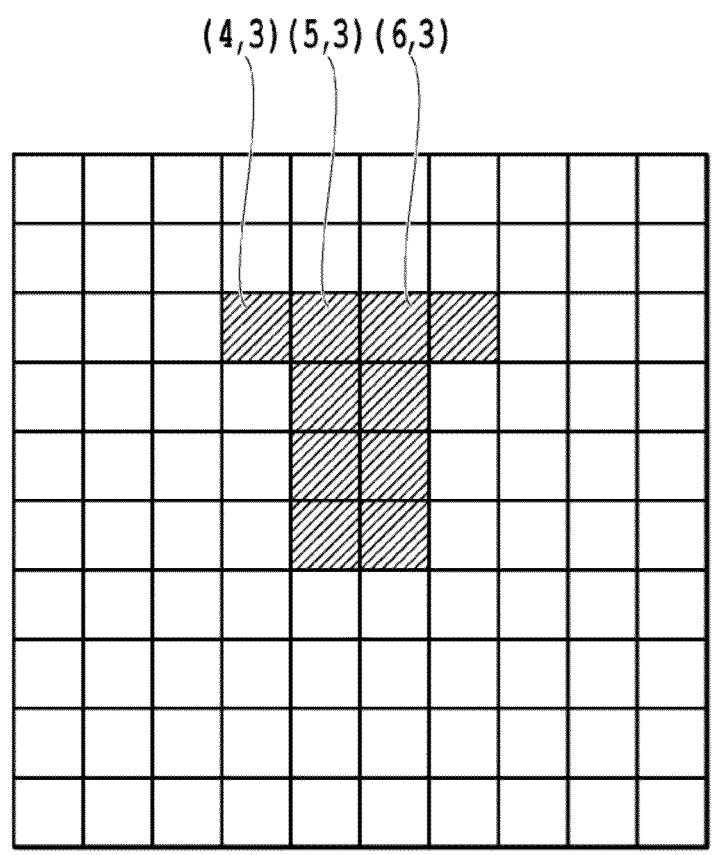
FIG. 30 is a diagram showing an example of attribute information in attribute conversion in Embodiment 8 of the present invention.

Next, in Step S2902, the management unit 221 determines whether an attribute other than the background attribute and the attribute converted in Step S2901 (converted attribute) exists behind the converted attribute or not. Here, the converted attribute is the text attribute and the small text attribute. In this determination, the management unit 221 obtains attributes of pixels around a pixel of the converted attribute, and determines that an attribute existing the most among the obtained attributes is the attribute behind the converted attribute. An example is described using FIG. 30. In FIG. 30, attributes of pixels painted white are the background attribute, and attributes of pixels painted black are the text attribute.

In converting the text attribute of a pixel with coordinates (4, 3) in the process of converting the text attribute, the management unit 221 obtains the attribute of a pixel with coordinates (3, 3) which is a pixel on the immediate left of the (4, 3) pixel. Since the attribute of the (3, 3) pixel is the background attribute, the management unit 221 determines that the attribute of a pixel behind the (4, 3) pixel is the background attribute. In addition, in converting a pixel with coordinates (5, 3), the management unit 221 obtains the attribute of a pixel with coordinates (4, 3) which is, again, a pixel on the immediate left of the (5, 3) pixel. Since the attribute of the (4, 3) pixel is the text attribute like the (5, 3) pixel, the management unit 221 determines that the attribute of a pixel behind the (5, 3) pixel is the background attribute like the (4, 3) pixel case. Although being determined based on the attribute of a pixel on the immediate left of the converted attribute in this example, the attribute behind the converted attribute may be determined based on the attributes of more pixels therearound in order to improve accuracy.

Alternatively, the management unit 221 may determine whether the area has a single attribute or not by using the level information 1904 in the drawing information 1900 in FIG. 19 generated based on the information contained in the operator information 1604 in FIG. 16, for example. Still alternatively, the level information 1904 and the method described above using FIG. 30 may be employed in combination.

Upon determining in Step S2902 that there is an attribute other than the background attribute and the converted attribute behind the converted attribute, the management unit 221 proceeds to Step S2903. In Step S2903, the management unit 221 generates attribute hint information containing area information on each area having the text attribute or the small text attribute converted and an image separation flag being turned ON. On the other hand, upon determining in Step S2902 that there is no attribute other than the background attribute and the converted attribute behind the converted attribute, i.e., an attribute behind the converted attribute is only the background attribute or the text or small text attribute, the management unit 221 proceeds to Step S2904. In Step S2904, the management unit 221 generates image area hint information containing area information corresponding to an area having the text attribute or the small text attribute converted and an image separation flag being turned OFF. The image area hint information may be generated with no image area separation flag being added thereto.

FIG. 31 shows an example configuration of image area hint information in which information indicating whether the area has a single attribute or not is associated with and added to the image area hint information in FIG. 23. Image area hint information 3100 includes an attribute type information 3101a indicating the type of the converted attribute (such as text or photographic image), a start-position coordinates 3101b and an end-position coordinates 3101c indicating the vertexes of a rectangle drawing area having the attribute, and an image area separation flag 3101d indicating whether the attribute is a single attribute or not. The image area separation flag 3101d is set based on an attribute behind the converted attribute. For example, the image area separation flag 3101d is turned OFF in a case where the converted attribute is a single attribute, i.e., has the background attribute therebehind, and is turned ON in a case where the converted attribute is not a single attribute, i.e., has an attribute other than the background attribute therebehind.

From the display list 2000 used for the image generation in Step S1703, the management unit 221 obtains drawing area information corresponding to the converted attribute. In a case, for example, where the converted attribute is the text attribute, the management unit 221 extracts, from the display list 2000, an object whose object type information 1901 indicates text, and obtains the start-position coordinates 1902 and the end-position coordinates 1903 in the drawing information 1900. The information thus obtained is set as image area hint information, as shown by a record 3102 on the middle row of FIG. 31. The management unit 221 repeats this processing for all the objects in the display list 2000 whose object type information 1901 of the drawing information 1900 indicates text. Further, the management unit 221 stores a value in the image area separation flag 3101d, the value being based on the attribute behind the converted attribute determined in Step S2902.

In Step S2905, the management unit 221 determines whether the transfer condition is satisfied or not. More specifically, the management unit 221 checks whether the transfer performance satisfying the performance index of the printing apparatus 110 can be achieved with the attribute information in which the text attribute and the small text attribute have been converted into the background attribute. The checking method is the same as that in Steps S1705 to S1707, and is therefore not described again here. The management unit 221 proceeds to Step S2906 upon determining that the transfer condition is not satisfied, or ends the attribute conversion processing upon determining that the transfer condition is satisfied.

In Step S2906, the management unit 221 converts all the graphics attribute (0x1), the line attribute (0x2), and the thin line attribute (0x6) in the attribute information into the background attribute (0xF). Generally, a figure, a halftone consisting of large and small dots, a ruled line, a broken like, and the like are any of the graphics attribute, the line attribute, and the thin line attribute. Objects of these attributes are scattered on a page of an electronic document and sometimes have complicated shapes. Thus, the efficiency of compressing the attribute information is poor for objects of those attributes, compared to objects of the photographic image attribute existing over a certain area, as will be described later. For this reason, in this embodiment, after the first conversion processing targeting the text attribute (0x3) and the small text attribute (0x7), the graphics attribute (0x1), the line attribute (0x2), and the thin line attribute (0x6) are converted into the background attribute (0xF) as second conversion processing, to improve the efficiency of compressing the attribute information.

Next, in Step S2907, the management unit 221 determines whether or not there is any attribute other than the background attribute and the converted attributes (the graphics attribute, the line attribute, and the thin line attribute here) behind the converted attribute. A method of determining an attribute behind the converted attribute is the same as that in Step S2902, and is therefore not described again here. Upon determining in Step S2907 that there is an attribute other than the background attribute and the converted attribute behind the converted attribute, in Step S2908 the management unit 221 generates attribute hint information containing area information on the converted attribute and an image area separation flag being turned ON. On the other hand, upon determining that there is no attribute other than the background attribute and the converted attribute behind the converted attribute, in Step S2909 the management unit 221 generates image area hint information containing area information on the converted attribute and an image area separation flag being turned OFF. Contents of the processing are the same as those in Steps S2903 and S2904, and are therefore not described again here.

In Step S2910, the management unit 221 determines again whether the transfer condition is satisfied or not. More specifically, the management unit 221 checks whether the transfer performance satisfying the performance index of the printing apparatus 110 can be achieved with the attribute information in which the graphics attribute, the line attribute, and the thin line attribute have been converted into the background attribute. The management unit 221 proceeds to Step S2911 upon determining that the transfer condition is not satisfied, or ends the attribute conversion processing upon determining that the transfer condition is satisfied.

Upon determining in Step S2910 that the transfer condition is not satisfied, in Step S2911 the management unit 221 converts the photographic image attribute (0x1) into the background attribute (0xF) as third conversion processing. Generally, a photographic image in an electronic document is an object of the photographic image attribute. An object of the photographic image attribute tends to exist over a certain area, and the compression efficiency is originally favorable. For this reason, in this embodiment, the photographic image attribute is the last attribute converted into the background attribute.

Next, in Step S2912, the management unit 221 determines whether there is an attribute other than the background attribute and the converted attribute behind the converted attribute. A method of determining an attribute behind the converted attribute is the same as that in Step S2902, and is therefore not described again here. Upon determining in Step S2912 that there is an attribute other than the background attribute and the converted attribute behind the converted attribute, the management unit 221 proceeds to Step S2913. In Step S2913, the management unit 221 generates attribute hint information containing area information on the converted attribute and an image area separation flag being turned ON. On the other hand, upon determining that there is no attribute other than the background attribute and the converted attribute behind the converted attribute, in Step S2914 the management unit 221 generates image area hint information containing area information on the converted attribute and an image area separation flag being turned OFF. Contents of the processing are the same as those in Steps S2903 and S2904, and are therefore not described again here.

With the above processing, information indicating whether the attribute is a single attribute or not is added to the image area hint information. Next, using FIG. 32, a description is given of how the printing apparatus 110 performs image area separation processing by use of this information.

Figure 32:
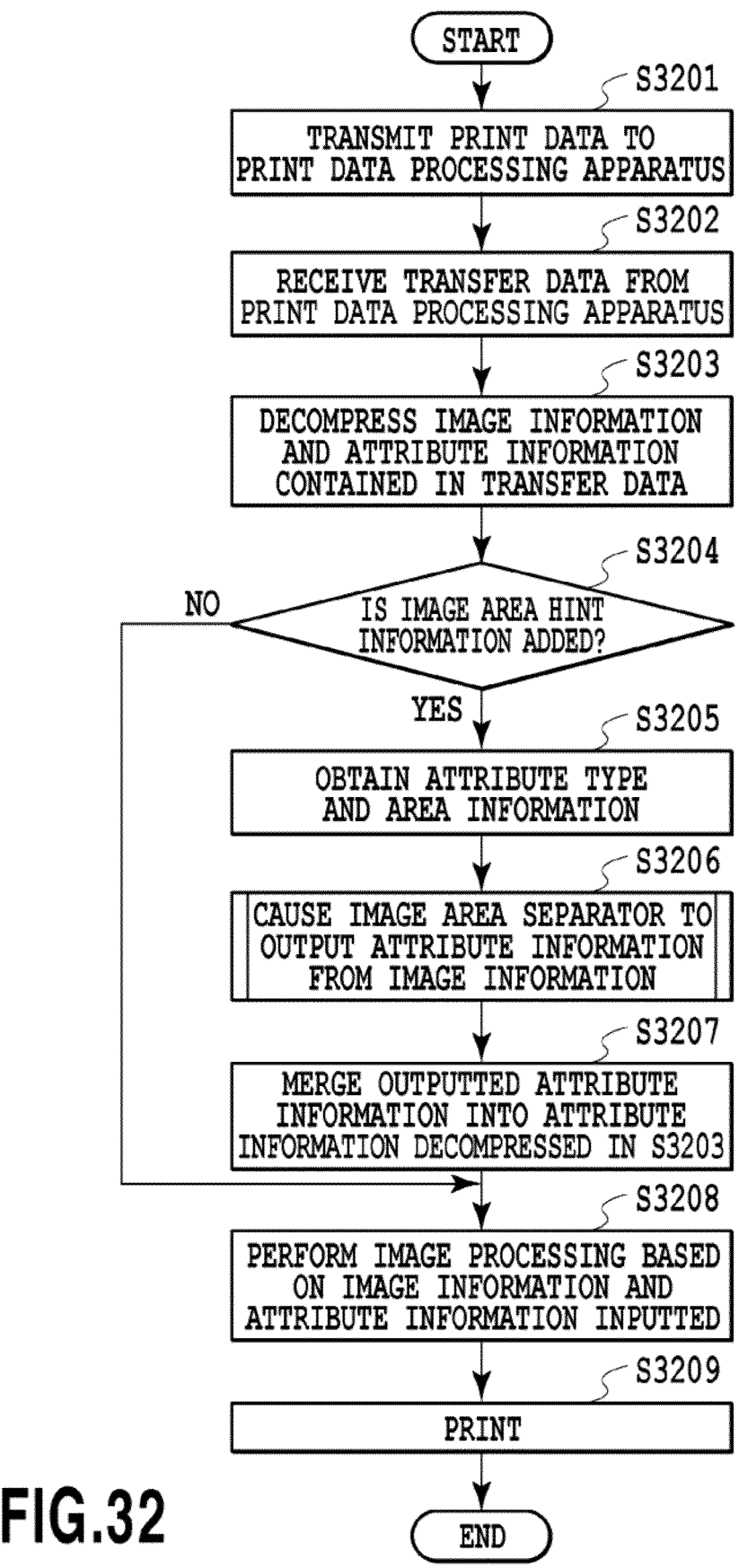
FIG. 32 is a flowchart showing an example of a series of processing performed by the printing apparatus in Embodiment 8 of the present invention.

FIG. 32 is a flowchart showing the processing performed by the software 210 of the printing apparatus 110 in this embodiment. As in FIG. 24, the processing in FIG. 32 is implemented by the CPU 111 executing the programs stored in the ROM 112.

In Step S3201, the management unit 211 transfers print data received by the printing apparatus 110 to the print data processing apparatus 120 through the network IF 115 by using the network control unit 212. Note that the processing in Step S3201 is not essential, and the processing may start from Step S3202. To be more specific, the printing apparatus 110 may perform processing described below, using data transmitted from the print data processing apparatus 120 without transmitting print data to the print data processing apparatus 120.

In Step S3202, the management unit 211 receives transfer data transmitted by the print data processing apparatus 120, by using the network control unit 212. The transfer data is, for example, the data shown in FIG. 21.

Since the image information 1213 and the attribute information 1214 contained in the transfer data received in Step S3202 have been compressed, in Step S3203 the decompression processor control unit 215 causes the decompression processor 114 to decompress the compressed image information and the compressed attribute information.

In S3204, the management unit 211 checks whether the received transfer data has the image area hint information 2100 added thereto, thereby determining whether the attribute information has been converted by the print data processing apparatus 120 or not. The management unit 211 proceeds to Step S3205 upon determining that the image area hint information 2100 is added, or proceeds to Step S3208 upon determining that the image area hint information 2100 is not added.

In Step S3205, the management unit 211 obtains the attribute type information 3101a, the start-position coordinates 3101b, the end-position coordinates 3101c, and the image area separation flag 3101d from the image area hint information 2100.

In Step S3206, the image area separator control unit 213 inputs a rectangle area, represented by the coordinates obtained in Step S3205, of the image information decompressed in Step S3203 into the image area separator 116, which outputs attribute information according to the value of the image area separation flag 3101d. Details of this processing are given using FIG. 33.

Figure 33:
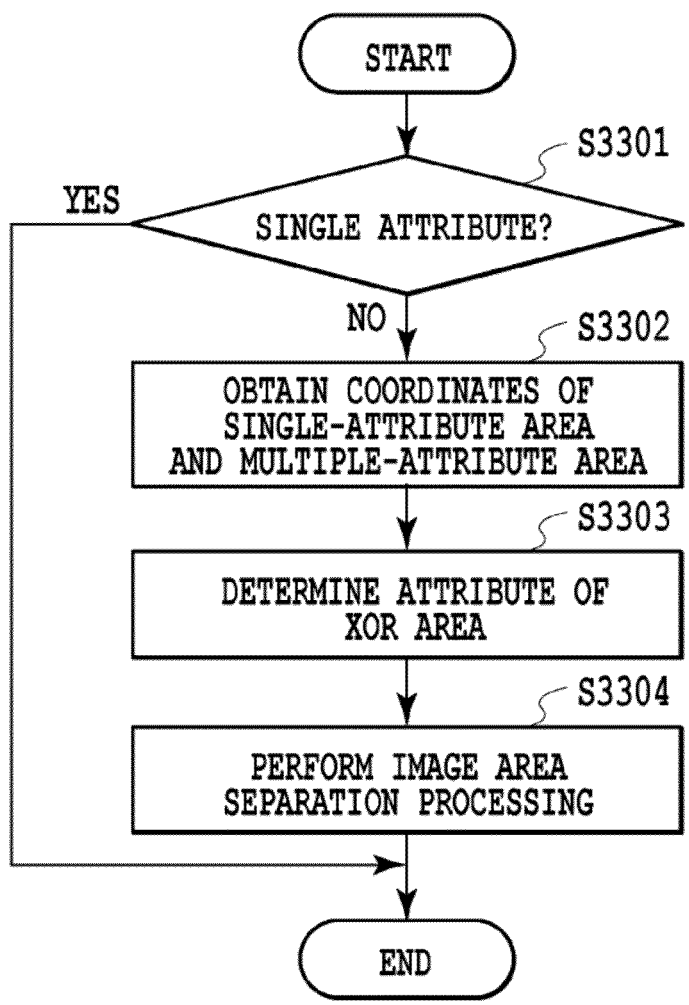
FIG. 33 is a flowchart showing an example of image area separation processing in Embodiment 8 of the present invention.

FIG. 33 is a flowchart showing the details of the processing in Step S3206, and this flow is implemented by the CPU 111 executing the programs stored in the ROM 112.

In Step S3301, the image area separator control unit 213 determines based on the image area separation flag 3101d in the image area hint information 2100 whether the rectangle area has only a single attribute or not. This determination is made by determining whether the image area separation flag 3103d is ON or OFF. The processing proceeds to Step S3302 in a case where the rectangle area has only a single attribute, or ends in the other case.

More specifically, in a case where the image area separation flag 3103d corresponding to the rectangle area is OFF, the image area separation control unit 213 determines that the rectangle area includes only a single attribute, and does not perform the image area separation processing on the rectangle area. Instead, the image area separator control unit 213 outputs, as attribute information, an attribute indicated by the attribute type information 3101a corresponding to the rectangle area. For example, in a case of the record 3102 of the image area hint information shown in FIG. 31 in which the image area separation flag is OFF, the text attribute is outputted as an attribute of the rectangle area formed by start-position coordinates (10, 10) and end-position coordinates (40, 20). On the other hand, in a case where the image area separation flag 3103d corresponding to the rectangle area is ON, the image area separation control unit 213 determines that the rectangle area includes multiple overlapping attributes, and proceeds to Step S3302.

In Step S3302, the image area separator control unit 213 separates the rectangle area into a single-attribute area and a multiple-attribute area, and obtains coordinates representing each area. For example, in a case of the page 2802 in FIG. 28, the image area separator control unit 213 obtains coordinates representing an area of the rectangle area 2802a excluding the rectangle area 2802c as a single-attribute area (namely the XOR area of the rectangle area 2802a and the rectangle area 2802b). In addition, the image area separator control unit 213 obtains coordinates representing an area of the rectangle area 2802b excluding the rectangle area 2802c as a single-attribute area (namely the XOR area of the rectangle area 2802a and the rectangle area 2802b). Moreover, the image area separator control unit 213 obtains coordinates representing the rectangle area 2802c as a multiple-attribute area (namely the AND area of the rectangle area 2802a and the rectangle area 2802b).

In Step S3303, the image area separator control unit 213 refers to the attribute type information 3101a and converts all the attributes in the single-attribute area represented by the coordinates obtained in Step S3302 into the same attribute as that indicated by the attribute type information 3101a. For example, in a case where an attribute set in the attribute type information 3101a of the attribute area corresponding to the rectangle area 2802a is "text," the image area separator control unit 213 does not perform the image area separation processing by using the image area separator 116, but sets the attribute of each of pixels of the single-attribute area to the text attribute and outputs such attribute information.

In Step S3304, the image area separator control unit 213 inputs the image information decompressed in Step S3203 into the image area separator 116, which performs the image area separation processing only on the area having multiple attributes obtained in Step S3302 and outputs attribute information. The image area separation processing performed by the image area separator 116 is the same as that in Embodiment 1, and is therefore not described again here.

Referring back to the flowchart in FIG. 32, in Step S3207, the management unit 211 merges the attribute information outputted in Step S3206 into the attribute information decompressed in Step S3203 to create new attribute information. In other words, the management unit 211 updates the attribute information decompressed in Step S3203 with the attribute information outputted in Step S3206.

In Step S3208, the image processor control unit 214 inputs the image information decompressed in Step S3203 and the attribute information decompressed in Step S3203 or the attribute information obtained by the merging in Step S3207 into the image processor 117, which then performs image processing.

In Step S3209, the management unit 211 passes a result of the image processing performed in Step S3208 to the engine control unit 216, which then prints using the engine 118.

As described above, in Embodiment 8, the image area separation processing is not performed on areas of a single attribute (where multiple different attributes do not overlap each other) to reduce the size of the area on which the image area separation processing is performed, compared to that in Embodiment 5. Thus, the printing apparatus 110 can perform its processing even faster.

Although an example based on Embodiment 5 is described in Embodiment 8, the determination on whether the area has a single attribute or not may be added to the modes described in Embodiments 6 and 7 so that the processing may be performed according to a result of the determination.

Other Embodiments

In the examples described in the above embodiments, the print data processing apparatus 120 processes print data received through the network IF 124 by using the network control unit 222. Alternatively, the print data processing apparatus 120 may be configured to allow, for example, a portable storage medium to be fitted thereto, and perform the processing described in the above examples using print data stored in the portable storage medium.

Moreover, instead of immediately transmitting, to the printing apparatus 110, image information and attribute information received through the network IF 124 using the network control unit 222 and processed therein, the print data processing apparatus may temporarily store them in a storage medium such as an HDD. For example, in cases such as where the available network bandwidth is extremely low or where the network itself is shut down, image information and attribute information which have already been processed may be temporarily stored in an HDD, and transmitted once the network becomes available.

Moreover, although the attribute information is actually compressed in Step S607 in FIG. 6 in Embodiment 1, only the data size of compressed attribute information may be calculated in Step S607. In this case, after it is determined in Step S605 that the transfer condition is satisfied, the attribute information may actually be compressed before the processing in Step S608.

Each page in print data or each print data may be processed by different modes of the attribute information conversion processing described in the embodiments.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-275791, filed Dec. 18, 2012, which is hereby incorporated by reference herein in its entirety.

What is claimed is:

1. A print data processing apparatus comprising:
a generation unit configured to generate image information and attribute information from print data;
a conversion unit configured to convert an attribute of a first area included in the attribute information, wherein an attribute of a second area included in the attribute information is not converted;
a compression unit configured to compress the image information and the attribute information in which the attribute of the first area has been converted by the conversion unit;
an area information generation unit configured to generate area information indicating the first area having the converted attribute; and
a transmission unit configured to transmit the image information compressed by the compression unit, the attribute information compressed by the compression unit, and the area information generated by the area information generation unit, to a printing apparatus as transfer data.

2. The print data processing apparatus according to claim 1, wherein
the transmission unit associates the area information with information on the converted attribute, and transmits the area information.

3. The print data processing apparatus according to claim 1, wherein
the transmission unit associates the area information with information indicating whether the area having the converted attribute is a single-attribute area or not, and transmits the area information.

4. The print data processing apparatus according to claim 1, further comprising an obtaining unit configured to obtain the area information from a drawing command contained in the print data, wherein
the transmission unit uses the area information obtained by the obtaining unit.

5. A print data processing apparatus comprising:
a reception unit configured to receive transfer data containing at least image information, converted attribute information, and area information indicating an area having the converted attribute, wherein an attribute of an area included in the converted attribute information has been converted from an original attribute and an attribute of an area different from an area having the converted attribute is original attribute;
a processing unit configured to perform image area separation processing on the area indicated by the area information, by using the image information;
an updating unit configured to update the attribute information contained in the transfer data, based on attribute data generated by the image area separation processing; and
a printing unit configured to perform printing processing based on the image information contained in the transfer data and the attribute information updated by the update unit.

6. The print data processing apparatus according to claim 5, wherein
the reception unit receives the transfer data in which the area information is associated with information indicating whether the area having the converted attribute is a single-attribute area or not, and
the processing unit performs the image area separation processing on an area indicated by the area information which is associated with information indicating that the area having the converted attribute is not a single-attribute area.

7. The print data processing apparatus according to claim 5, wherein
the reception unit receives the transfer data in which the area information is associated with information indicating whether the area having the converted attribute is a single-attribute area or not, and
the processing unit does not perform the image area separation processing on an area indicated by the area information which is associated with information indicating that the area having the converted attribute is a single-attribute area.

8. The print data processing apparatus according to claim 7, wherein
the reception unit receives the area information further associated with information on the converted attribute, and
instead of not performing the image area separation processing, the processing unit outputs, as the attribute information, an attribute associated with the area information associated with the information indicating that the area having the converted attribute is a single-attribute area.

9. A print data processing method comprising:
generating image information and attribute information from print data;
converting an attribute of a first area included in the attribute information, wherein an attribute of a second area included in the attribute information is not converted;
compressing the image information and the attribute information in which the attribute of the first area has been converted in the conversion step; and
generating area information indicating the first area having the converted attribute;
transmitting the image information compressed in the compression step, the attribute information compressed in the compression step, and the area information generated in the generating step, to a printing apparatus as transfer data.

* * * * *